(12) United States Patent
Kuroda

(10) Patent No.: US 7,376,337 B2
(45) Date of Patent: May 20, 2008

(54) VIDEO SIGNAL RECORDING APPARATUS FOR COPYRIGHTED WORKS

(75) Inventor: Tokuji Kuroda, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 889 days.

(21) Appl. No.: 10/671,623

(22) Filed: Sep. 29, 2003

(65) Prior Publication Data

US 2004/0062527 A1    Apr. 1, 2004

(30) Foreign Application Priority Data

Sep. 30, 2002    (JP)    .............................. 2002-286725

(51) Int. Cl.
  H04N 5/91     (2006.01)
  H04N 7/167    (2006.01)
  G11B 19/04    (2006.01)
(52) U.S. Cl. ........................... 386/94; 380/201; 360/60
(58) Field of Classification Search ................. 386/94, 386/1; 360/60; 380/201, 203
  See application file for complete search history.

(56) References Cited

U.S. PATENT DOCUMENTS

| | | | | |
|---|---|---|---|---|
| 3,806,923 A * | 4/1974 | Tsuruta et al. ................. 342/92 |
| 4,389,671 A * | 6/1983 | Posner et al. ................. 380/235 |
| 4,438,495 A * | 3/1984 | Collins et al. ................. 382/131 |
| 4,695,901 A * | 9/1987 | Ryan .......................... 380/204 |
| 4,907,104 A * | 3/1990 | Haikawa ....................... 360/64 |
| 5,077,734 A * | 12/1991 | Ohtsuka ....................... 370/509 |
| 5,157,510 A * | 10/1992 | Quan et al. ................... 386/94 |
| 5,161,188 A * | 11/1992 | Pires .......................... 380/213 |
| 5,179,452 A * | 1/1993 | Takahashi ..................... 386/94 |
| 5,194,965 A * | 3/1993 | Quan et al. ................... 386/94 |
| 5,337,157 A * | 8/1994 | Nakata ......................... 386/94 |
| 5,953,417 A * | 9/1999 | Quan .......................... 380/203 |
| 5,991,500 A * | 11/1999 | Kanota et al. ................. 386/94 |
| 6,002,830 A * | 12/1999 | Quan .......................... 386/1 |
| 6,058,191 A * | 5/2000 | Quan .......................... 380/203 |
| 6,173,109 B1 * | 1/2001 | Quan .......................... 386/1 |
| 6,253,020 B1 * | 6/2001 | Ogino et al. .................. 386/94 |
| 6,268,889 B1 * | 7/2001 | Koori ......................... 348/642 |
| 6,421,497 B1 * | 7/2002 | Quan .......................... 386/1 |
| 6,430,291 B1 * | 8/2002 | Ogino et al. .................. 380/203 |
| 6,836,549 B1 * | 12/2004 | Quan et al. ................... 380/221 |
| 2001/0019659 A1 * | 9/2001 | Hirai .......................... 386/83 |
| 2002/0123968 A1 * | 9/2002 | Okayama et al. ............. 705/57 |
| 2002/0136527 A1 * | 9/2002 | Nishizaka et al. ............. 386/1 |

FOREIGN PATENT DOCUMENTS

JP    9-180295    7/1997
JP    2001-14793  1/2001

* cited by examiner

Primary Examiner—Thai Q. Tran
Assistant Examiner—Daquan Zhao
(74) Attorney, Agent, or Firm—Wenderoth, Lind & Ponack, L.L.P.

(57) ABSTRACT

In a video signal recording apparatus for digitally recording a first video signal, a copyright information detecting unit extracts copyright information inserted in the first video signal. An active period decision signal generating unit detects an active pixel period of the first video signal to generate an active period decision signal. A fixed value output unit outputs a second video signal containing information representing a non-copyrighted work. A selecting unit replaces the first video signal by the second video signal in the active pixel period when it is determined, based on the copyright information and the active period decision signal, that the first video signal indicates information representing a copyrighted work, thereby generating a third video signal.

3 Claims, 17 Drawing Sheets

VIDEO SIGNAL RECORDING APPARATUS FOR COPYRIGHTED WORKS

BACKGROUND OF THE INVENTION

1. Field of the Invention

The present invention relates to data recording apparatuses for digitally recording data containing information representing a copyrighted work on a recording medium, such as a video tape, hard disk, or an optical disk. More specifically, the present invention relates to a video signal recording apparatus for digitally recording video signals containing information representing a copyrighted work.

2. Description of the Related Art

In recent years, video recording apparatuses which can perform digital recording of video signals on a recording medium, such as a digital video tape, a hard disk, or DVD, have rapidly become widespread, instead of those which can perform conventional analog recording on a recording medium, such as a VHS tape. When the video signals to be recorded are analog, the MPEG-2 picture compression scheme is used to first convert these analog video signals to digital video signals with a reduced amount of information and then record such digital signals on a recording medium. When the video signals to be recorded are digital, these digital video signals are recorded as they are on a recording medium.

In conventional analog recording, copying of video signals from one recording medium to another, that is, dubbing, causes significant degradation in image quality, leading to a protection of a copyrighted work included in data to be recorded. In digital recording, on the other hand, when the data to be recorded is digital, dubbing does not cause degradation in image quality as long as the there is no problem with the medium or the recording apparatus. The same goes for analog data once converted to digital data. Therefore, video signal recording apparatuses for digital recording should adopt a copyright protection technology for prohibiting illegal copying of data containing information representing a copyrighted work.

A typical copyright protection technology is described below. Signals for copyguard protection, which are superimposed on analog video signals of the National Television System Committee (NTSC) scheme for controlling dubbing, are broadly classified into Macrovision signals and Vertical Blanking ID (VB-ID) signals. A Macrovision signal is composed of an AGC pulse for inserting a pseudo-synchronizing signal and a color stripe for inverting the phase of a burst signal of a specific line. That is, an erroneous signal is inserted in a blanking period of the video signal to cause erroneous synchronization in the recording apparatus and an erroneous operation of the AGC, thereby preventing normal recording. In other words, copyright protection is achieved by a significant degradation in signal quality after copying.

A VB-ID signal, on the other hand, is composed of information of 20 bits, being inserted in the twentieth line in a vertical blanking period of an NTSC signal. The VB-ID signal includes a Copy Generation Management System-Analog (CGMS-A) signal, which represents generation management information about the work. The CGMS-A signal is composed of two bits for representing three types of information: No copying is permitted, one generation of copies may be made, and copying is permitted without restriction. Based on these three types of information, the recording apparatus determines whether a recording operation is permitted. That is, copyright protection is achieved not by degrading signal quality after copying but by restricting the number of times of copying.

The above-described Macrovision signal and VB-ID signal are signals for directly or indirectly controlling the input signal copying operation of the recoding apparatus. Also, these signals identify the input signal as containing information representing a copyrighted work. In other words, the Macrovision signal and VB-ID signal are copyguard signals which indicate that information representing a copyrighted work is mixed in the input signal and also indicate copyright information representing the degree of copyright protection for the work. A minimum period in which such a copyguard signal is inserted is one field.

With reference to FIGS. 15 and 16, a conventional video signal recording apparatus which supports Macrovision signals or VB-ID signals (CGMS-A signals) is described below. As illustrated in FIG. 15, a video signal recording apparatus DRc1 includes an input signal processing unit 101, a copyright information detecting unit 102, a recording processing unit 106, a recording unit 107, and a recording control unit 111. In the video signal recording apparatus DRc1, the input signal processing unit 101 performs a process, such as separation of a synchronizing signal or analog-digital conversion, on an analog video signal Sva to generate a digital video signal Svd for output to the recording processing unit 106. Also, the signal input unit 101 outputs the analog video signal Sva to the copyright information detecting unit 102.

The copyright information detecting unit 102 detects a Macrovision signal or a CGMS-A signal superimposed on the analog video signal Sva to extract copyright information, thereby generating a copyright information signal Scr. Based on the copyright information signal Scr, the recording control unit 111 generates a recording control signal Sc for controlling the recording operation of the recording processing unit 106.

The recording processing unit 106 performs a recording process, which complies with the recording unit 107, on the digital video signal Svd output from the input signal processing unit 101. The recording processing unit 106 preferably includes an MPEG2 image compressing means for compressing the digital video signal Svd, converting the compressed signal to a signal format for recording on a hard disk, and then outputting an MPEG image signal Smpg. The recording operation of the recording processing unit 106 is controlled by the recording control signal Sc supplied by the recording control unit 111. The recording unit 107 records the MPEG image signal Smpg supplied by the recording processing unit 106 on a digital recording medium, such as a hard disk.

A copying control operation of the video signal recording apparatus DRc1 is described below in a case where a copy guard signal, such as a Macrovision signal or a CGMS-A signals, is detected in the input analog video signal Sva. For example, when the copyright information detecting unit 102 detects in the analog video signal Sva an AGC pulse of a Macrovision signal or both of an AGC pulse and a color stripe thereof, this means that copying is prohibited. Therefore, the copyright information detecting unit 102 outputs to the recording control unit 111 a copyright information signal Scr representing that copying of the analog video signal Sva is prohibited. Since the minimum period in which a copyguard signal is inserted in the analog video signal Sva is one field, the copyright information signal Scr indicates whether copying of at least one field is prohibited.

Based on the copyright information signal Scr indicative of copying prohibition, the recording control unit 111 outputs a recording control signal Sc indicative of recording prohibition so as to stop or prevent the recording processing operation of the recording processing unit 106. When the recording processing unit 106 has been set to perform a timer-controlled recording operation, this timer-controlled recording operation is cancelled so as to be prohibited.

Next, a copying control operation of the video signal recording apparatus DRc1 is described below in a case where a CGMS-A signal is detected. When the CGMS-A signal indicates that copying is prohibited, the copyright information detecting unit 102 outputs a copyright information signal Scr indicating that copying is prohibited. The recording control unit 111 outputs a recording control signal Sc for prohibiting a recording process so as to stop or prohibit the recording processing operation of the recording processing unit 106. When the CGMS-A signal indicates that copying is permitted without restriction or that one generation of copies may be made, the copyright information detecting unit 102 outputs a copyright information signal Scr indicating that recording can be made. Based on this copyright information signal Scr, the recording control unit 111 outputs a recording control signal Sc for allowing the recording processing operation. Based on the recording control signal Sc, there cording processing unit 106 performs the recording processing operation or continues the timer-controlled recording operation.

FIG. 16 schematically illustrates recording areas of the recording medium of the recording unit 107. The recording medium of the recording unit 107 is broadly divided into three areas: a filing system information area AFS, a video file management information area AAD, and a video file area AAV, which are listed in increasing order of physical address. The video file area AAV stores video files which are output as the MPEG image signals Smpg from the recording processing unit 106 of the video signal recording apparatus DRc1 so as to be recorded on the recording unit 107. The filing system information area AFS records filing system information indicating which video files are recorded in which address of the video file area AAV.

The video file management information area AAD records video file management information including a recording start time, a recording time length, a recoding TV channel, a recoding TV program, and recoding mode information. The video file management information can specify the contents of each video file recorded in the video file area AAV. With the use of the video file management information, it is possible to present the contents of the recoded video file to the user. The video file management information is fed to the video signal recording apparatus DRc1 through a means (not shown) for detecting the state of user's operation and the channel of the analog video signal Sva input to an input terminal 20.

The number of files that can be managed in each of the filing system information area AFS and the video file management information area AAD is not uniquely related to the recording capacity of the video file area AAV. Therefore, however spaces remain in the hard disk, they cannot be used when the number of managed files passes the upper limit.

The capacity of each of the filing system information area AFS and the video file management information area AAD is set to be significantly smaller than that of the video file area AAV. Once the filing system information area AFS is completely consumed, the recording unit 107 cannot record video files anymore even if unused recording areas remain in the video file area AAV. Furthermore, once the video file management information area is completely consumed, the contents of the video files recorded on the video file area AAV cannot be specified anymore.

With reference to FIG. 17, a video signal recording apparatus disclosed in Japanese Patent Laid-Open Publication No. 2001-14793 is described below, in which a pre-process for replay is omitted for a copying-prohibited input signal. A video signal recording apparatus DRc2 includes a recording medium drive control unit 50, a recording medium 51, a signal recording/replaying processing unit 52, a deshuffling processing unit 53, a deshuffling control unit 54, a copyright information detecting unit 55, a video signal processing unit 56, an external signal input unit 57, a video signal output unit 58, and a monitor 59. The recording medium 51 is preferably a medium having digital signals recordable thereon and reproduced therefrom, and is typically a magnetic tape, an optical disk, or a magnetic disk.

The recording medium drive control unit 50 drives the recording medium 51 to perform an operation of recording video/audio signals. The external signal input unit 57 receives an external input signal to be recorded on the recording medium 51 for supply to the video signal recording apparatus DRc2. The video signal processing unit 56 performs, in response to a recording/replaying operation, video signal processing, such as compression, decompression, error correction, and shuffling. The video signal output unit 58 outputs the replayed recorded video to the monitor 59. The signal recording/replaying processing unit 52 replays the video signal recorded on the recording medium 51, and records the video signal on the recoding medium 51.

At the time of replaying, the deshuffling processing unit 53 deshuffles video signals supplied by the signal recording/replaying processing unit 52, and then outputs the resultant signals to the video signal processing unit 56. At the time of recording, the deshuffling processing unit 53 deshuffles signals supplied by the video signal processing unit 56, and then outputs the resultant signals to the signal recording/replaying processing unit 52.

The deshuffling control unit 54 controls the deshuffling operation of the deshuffling processing unit 53 to start or stop at the time of recording/replaying, and also controls the driving operation of the recording medium drive control unit 50. The copyright information detecting unit 55 detects various information including copyright information contained in the external input signal at the time of recording.

The recording operation of the above-structured video signal recording apparatus DRc2 is described below. First, an external video signal Sve to be recorded on the recording medium 51 is fed through the external signal input unit 57. The external video signal Sve is typically a tuner input video signal of analog broadcasting or a video signal input through an analog external input terminal.

Next, the external video signal input through the external signal input unit 57 is supplied to the video signal processing unit 56 for video signal processing. When the external video signal Sve is an analog signal (Sva), the external video signal Sve is output through the video signal output unit 58 to the monitor 59 for presenting video to be recorded on the recording medium 51. Furthermore, the video signal processing unit 56 extracts copyright information from the input external video signal Sve (Sva), and also performs a band compressing process to convert the external video signal Sve (Sva) to a digital signal (Svd).

Next, the extraction result obtained by the video signal processing unit 56 is identified by the copyright information detecting unit 55. As a result of the identifying process, if the external video signal Sve is "recordable", that is, copying is permitted, or if no copyright information or no copyguard signal is provided to the external video signal Sve, the deshuffling control unit 54 is controlled so that the deshuffling processing unit 53 performs a deshuffling process. If the external video signal Sve is "not recordable", that is, copying is prohibited, the deshuffling control unit 54 is controlled so that the deshuffling processing unit 53 does not perform a deshuffling process. Then, the video signal output from the deshuffling processing unit 53 is recorded by the signal recording/replaying processing unit 52 on the recording medium 51.

Another recording apparatus is disclosed in Japanese Patent Laid-Open Publication No. 9-180295 (1997-180295), in which a signal to be recoded is muted while copying is prohibited and, once prohibition is removed, a recording operation is started. In this recording apparatus, copying-prohibition data included in the signal to be recorded is detected in order to control the recording operation of the recording system. The recording operation is in a wait state for portions of which recording is prohibited until copying prohibition is removed, and is performed for portions other than the above copying-prohibited portions. While a copying detection signal is being detected, the signal to be recorded is muted, but recording itself is not interrupted, thereby allowing the entire program of television broadcasting to be recorded, for example. Note that, in this recording apparatus, received signals of analog television broadcasting, received data of digital television broadcasting, and digital signals supplied from a computer through an I/O interface to the recording system can be also supplied to the recording system after being muted by a relevant muting circuit.

The above-described video signal recording apparatus which stops recording for each copyrighted work requires a complicated process of notifying the user that recording is stopped. For example, consider a case where a user starts manual recording by pressing a recording start button, and external video signals are copyrighted and are therefore copying-prohibited. In this case, some measures have to be taken so as to stop or not to start the recording operation, and also so as to display a message indicating, for example, that "recoding is prohibited by copyright" on a monitor screen.

Moreover, timer-controlled recording, which automatically starts recording by a timer, requires a process more complicated than that of manual recording. That is, if recording of the program set by timer-controlled recording is prohibited by copyright, the information about prohibition has to be held until the user next operates the recording apparatus. Then, for example, when the user next operates the recording apparatus, a message indicating that recording is prohibited is displayed on the screen of the monitor. This requires very complicated processes, making it difficult to develop software for the recording apparatus.

Still further, consider a case where the input terminal of the recording apparatus is connected to an analog output of a tuner for digital satellite broadcasting. In digital satellite broadcasting, rain could degrade the reception state, causing a weak electric field. In such a weak electric field, copyright information (copyguard signal) included in digital satellite broadcasting may not be able to be correctly detected by the tuner. For example, the copyright protection information of the input video signal is detected as being frequently changed. In one case, a CGMS-A signal of a program is detected as being alternately indicative of "copying-prohibited" and "copying-permitted".

As described above, in the case where the video signal whose copyright protection information is frequently changed is supplied in a weak electric field caused by rain, for example, the video signal recording apparatus DRc1 starts and stops recording alternately and repeatedly. In recording apparatuses using a hard disk, data from starting recording to data at the stopping of recording are managed as a single video file. Also, each video file includes management information for the purpose of later displaying the recorded video files as a list. Therefore, repetition of starting and stopping recording creates a large number of video files, consuming a large amount of the filing system information area AFS and the video file management information area AAD. This makes it impossible to efficiently use the filing system information area AFS. At the worst, some video files cannot be recorded.

In the filing system, the limitation on the number of manageable files and the capacity of the hard disk have a tradeoff relationship. Therefore, the limitation on the number of manageable files can be mitigated by increasing the capacity of the hard disk, as well as the power of the CPU for managing a large number of files. In commercial recording apparatuses, however, it is a waste to use a CPU of overly high capability to perform only file management processing only for the purpose of managing a large number of files. This is one reason for limiting the number of files.

Moreover, if the capacity of the hard disk is increased without extending the filing system, the areas of the hard disk are not efficiently used. Extension of the filing system may alleviate inefficient use of the hard disk, but may require more capability of file management.

In the above-described video signal recording apparatus (Japanese Patent Laid-Open Publication No. 2001-14793), copying-prohibited external video signals are recorded on the recording medium without being deshuffled. In this case, the original external video signals without being deshuffled are recorded on the recording medium, meaning that the original external video signals can be extracted as they are. This does not provide complete protection of copyright of the original external video signals.

Moreover, upon stopping a deshuffling process, the above-described video recording apparatus is not capable of notifying the user that the deshuffling process has stopped for copyright protection. For example, if video signals indicative of a white or black full-screen picture are supplied, video signals to be recorded with deshuffling and those to be recorded without deshuffling provide exactly the same image. Therefore, the user cannot know from the replayed video whether the video is copyright-protected.

Furthermore, in the above-described recording apparatus (Japanese Patent Laid-Open Publication No. 9-180295), the user cannot ascertain which reason correctly explains why a portion has been muted at the time of replaying, due to a lack of an input signal or copyright protection. In order to allow the user to ascertain the reason of the mute, a complicated process is required for notifying the user that the mute has been performed for the purpose of copyright protection.

Still further, in order to record signals containing information representing a copyrighted work, such information is replaced by information representing a non-copyrighted work. From the recorded information representing the non-copyrighted work as a replacement, the information representing the original copyrighted work cannot be recovered. That is, the original work has been discarded. Therefore, when permission for using the original work is obtained later, the original work has to be again obtained (received and recorded).

SUMMARY OF THE INVENTION

Therefore, in order to solve the above problems, a first object of the present invention is to provide a video signal recording apparatus which can achieve complete copyright protection, allow a user to easily recognize that a work represented by a input video signal is copyrighted, and achieve simple management of recorded video files so as to save space in a filing system information area and a video file management information area. Furthermore, a second object of the present invention is to provide a video signal recording apparatus which can protect a copyright of a work and, once copyright restrictions are removed, can record the work for easy reuse.

In a video signal recording apparatus for digitally recording a first video signal containing information representing a copyrighted work and information representing a non-copyrighted work, a copyright information detecting unit extracts copyright information inserted in a first video signal. An active pixel period detecting unit detects an active pixel period of the first video signal to generate an active period decision signal. A video signal output unit outputs a second video signal indicative of information representing another non-copyrighted work. A video signal generating unit replaces the first video signal by the second video signal in the active pixel period when it is determined based on the copyright information and the active period decision signal that the first video signal represents information representing a copyrighted work, thereby generating a third video signal.

In the video signal recording apparatus according to the present invention, even if the input signal contains information representing a copyrighted work and information representing a non-copyrighted work, the copyrighted work is replaced by another non-copyrighted work, and is then recorded as one file. This can achieve copyright protection and reduce loads of managing the recorded files. Also, it can be easily recognized at the time of replaying that the non-copyrighted work has been recorded in place of the copyrighted work.

Furthermore, the copyrighted work is scrambled (encrypted) for recording, thereby achieving copyright protection. Also, once copyright restrictions are removed later, the recorded work can be used.

Still further, at the time of recording the input signal containing information representing a copyrighted work and information representing a non-copyrighted work, information for identifying the locations of the copyrighted work and the non-copyrighted work in that file is added for recording. With this, the copyrighted portions and the non-copyrighted portions can be selectively displayed or replayed.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
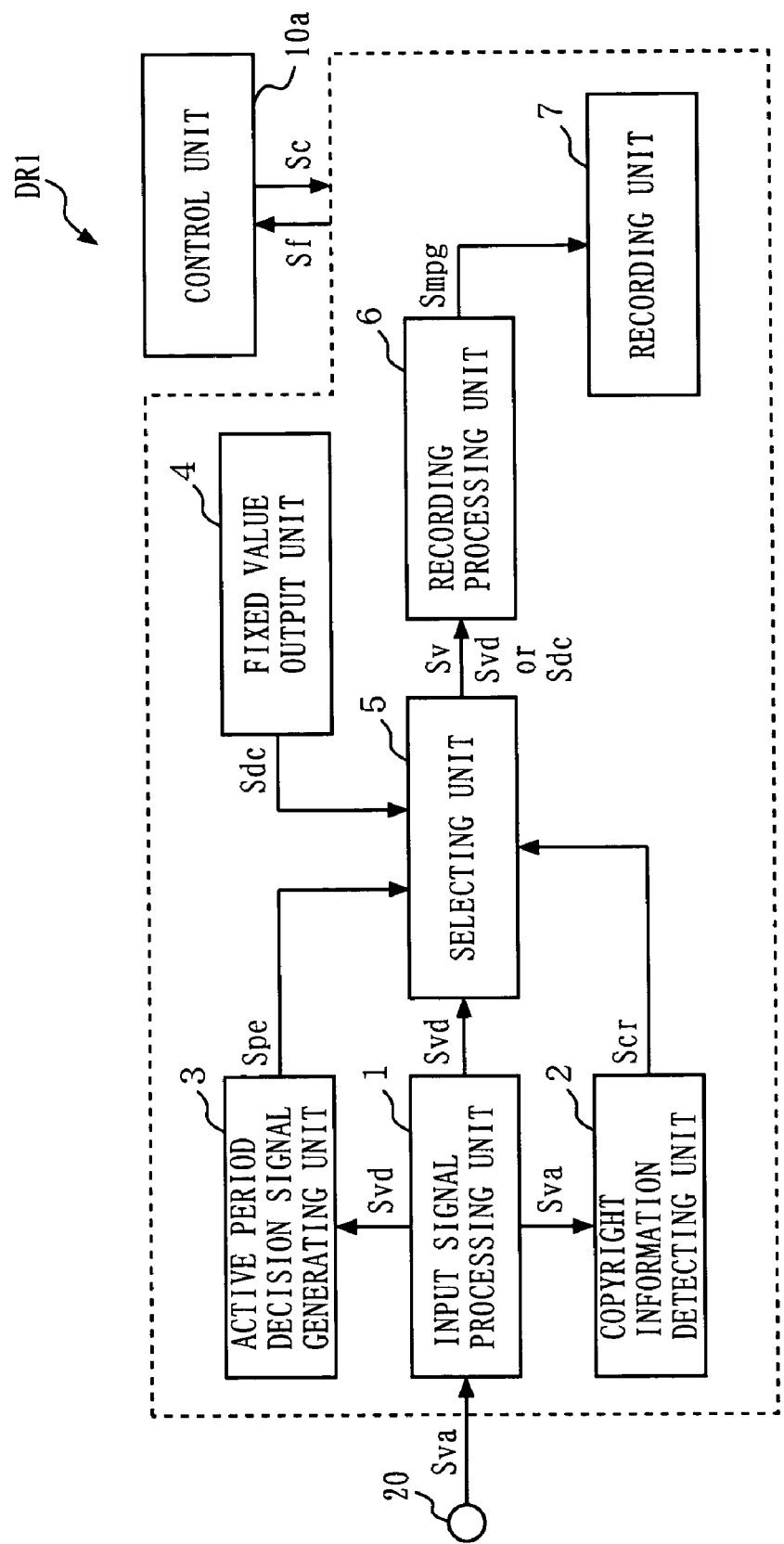
FIG. 1 is a block diagram illustrating the structure of a video signal recording apparatus according to a first embodiment of the present invention.
Figure 2:
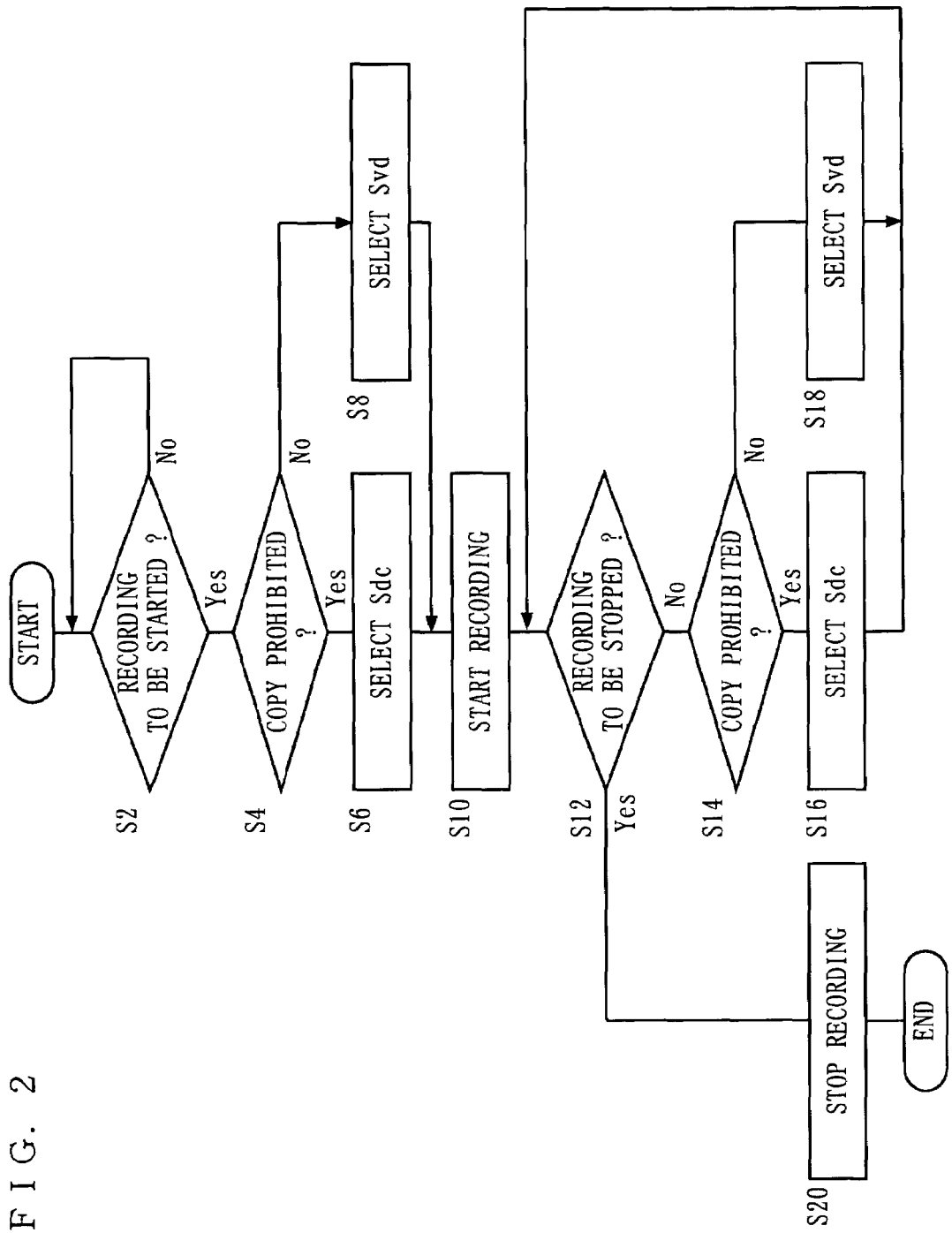
FIG. 2 is a flowchart showing the operation of the video signal recording apparatus illustrated in FIG. 1.
Figure 3:
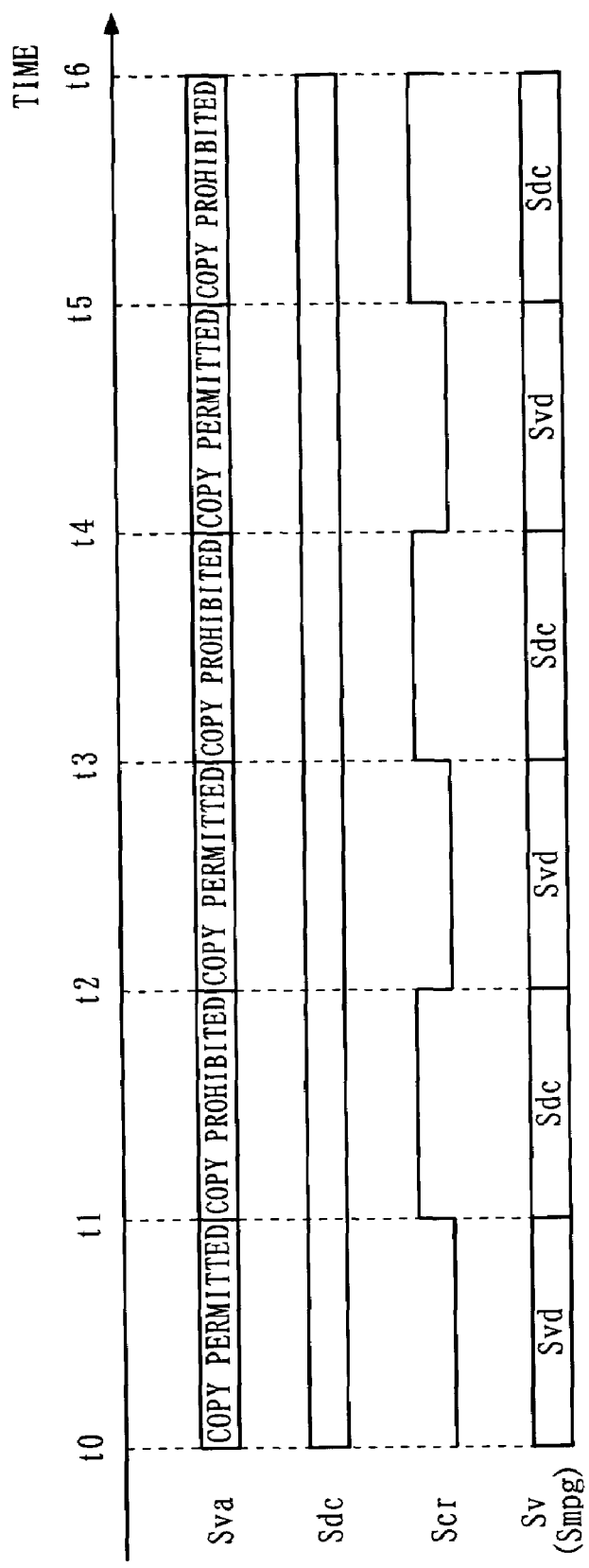
FIG. 3 is a time chart showing various signals in the video signal recording apparatus illustrated in FIG. 1.

With reference to FIGS. 1, 2, and 3, a video signal recording apparatus according a first embodiment of the present invention is described below. A video signal recording apparatus DR1 according to the first embodiment includes an input signal processing unit 1, a copyright information detecting unit 2, an active period decision signal generating unit 3, a fixed value output unit 4, a selecting unit 5, a recording processing unit 6, a recording unit 7, and a control unit 10a. The input signal processing unit 1 performs processes, such as synchronizing signal separation and analog-digital conversion, on an analog video signal Sva supplied through an input terminal 20 to generate a digital video signal Svd for output to the active period decision signal generating unit 3 and the selecting unit 5. The digital video signal Svd complies with CCIR656 standards, having synchronizing signals called SAV (Start of active video) and EAV (End of active video) being inserted in a horizontal blanking period.

The copyright information detecting unit 2 detects a copyguard signal, such as a Macrovision signal or a CGMS-A signal, superimposed on the analog video signal Sva supplied through the input signal processing unit 1 to extract copyright information, thereby generating a copyright information signal Scr. In the present example, the copyright information signal Scr is a binary signal which becomes Low when the input analog video signal Sva is "copying-permitted" and becomes High when the input analog video signal Sva is "copying-prohibited".

The active period decision signal generating unit 3 generates an active period decision signal Spe indicative of an active pixel period of the digital video signal Svd output from the input signal processing unit 1, and then outputs the generated signal to the selecting unit 5. The active period decision signal Spe is a binary signal which becomes High during an active pixel period except horizontal and vertical blanking periods of the digital video signal Svd, and otherwise becomes Low.

The fixed value output unit 4 outputs a DC value, which is a fixed value, in accordance with an output timing of the digital video signal Svd, thereby generating a fixed value signal Sdc. In this example, the fixed value signal Sdc is a still picture signal indicative of a blue full-screen picture, but this is not meant to be restrictive. As will be described further below, the fixed value signal Sdc can be any signal as long as it is a signal from which the user can easily recognize, at the time of replaying, that the signal is clearly not a normal signal for recording but there is no abnormality.

The digital video signal Svd has a digital value of an eight-bit width, and is transmitted in the order of a Pb signal, a Y signal, a Pr signal, and then a Y signal. The fixed value output unit 4 outputs D0 (HEX) in accordance with the timing of the Pb signal, 08 (HEX) in accordance with the timing of the Y signal, and 80 (HEX) in accordance with the timing of the Pr signal.

Based on the active period decision signal Spe output from the active period decision signal generating unit 3 and the copyright information signal Scr output from the copyright information detecting unit 2, the selecting unit 5 selects, as a recording digital video signal Sv, either one of the digital video signal Svd and the fixed value signal Sdc, and then outputs the selected signal to the recording processing unit 6. That is, based on the value of the copyright information signal Scr, the selecting unit 5 outputs either one of the digital video signal Svd and the fixed value signal Sdc in accordance with the timing of the active period decision signal Spe.

In other words, if copyright information indicating "copying-prohibited", which is represented by a signal, such as a Macrovision signal or a CGMS-A signal, is detected in the analog video signal, that is, if an AGC pulse of the Macrovision signal exists or if both of an AGC pulse and a color strip are detected, the copyright information detecting unit 2 generates a copyright information signal Scr at a High level. On the other hand, if no AGC pulse or no color strip is detected in the analog video signal Sva, this means "copy-permitted", and therefore a copyright information signal Scr at a Low level is generated.

When the copyright information signal Scr is at a High level, the selecting unit 5 selects the fixed value signal Sdc only during the active pixel period of the digital video signal Svd, and then outputs the selected signal as the recording digital video signal Sv. That is, the fixed value signal Sdc is output while the active period decision signal Spe is at a High level, and the digital video signal Svd is output while the active period decision signal Spe is at a Low level. When the copyright information signal Scr is at a Low level, on the other hand, the digital video signal Svd is always output as the recording digital video signal Sv, irrespectively of the active period decision signal Spe.

The recording processing unit 6 performs a recording process on the digital video signal Svd or the fixed value signal Sdc output from the selecting unit 5 as the recording digital video signal Sv for conversion to an MPEG image signal Smpg, and then outputs the MPEG image signal Smpg to the recording unit 7. The recording unit 7 is structured in a manner similar to that of the previously-described recording unit 107 for digitally recording the MPEG image signal Smpg in the video file area AAV. Before a video file is recorded, video file management information representing the contents of the video file is recorded in the video file management information area AAD.

The control unit 10a is supplied with a feedback signal Sf indicative of the state of operation of each component of the video signal recording apparatus DR1 and a user instruction command through an input unit (not shown), such as a remote controller or a keyboard. Based on the feedback signal Sf and the user instruction command, the control unit 10a generates a control signal Sc for controlling the operation of each component of the video signal recording apparatus DR1.

With reference to FIG. 2, the recording operation of the video signal recording apparatus DR1 is described below by focusing on the operation of the selecting unit 5. Once the video signal recording apparatus DR1 is powered on to start the digital video signal recording operation, the control unit 10a determines in step S2 whether recording of the analog video signal Sva is to be started. This determination is based on the user instruction command, such as a decision of whether a recording start button has been pressed. If it is determined that recording is to be started, the control procedure goes to the next step S4.

In step S4, the copyright information detecting unit 2 determines whether the input analog video signal Sva is copying-prohibited. That is, when the copyright information signal Scr is at a High level, it is determined that the input analog video signal Sva is copying-prohibited, and then the control procedure goes to step S6. When it is determined in step S4 that the input analog video signal Sva is not copying-prohibited, the control procedure goes to step S8.

In step S6, the selecting unit 5 selects the fixed value signal Sdc as the recording digital video signal Sv for output to the recording processing unit 6. That is, the fixed value signal Sdc is recorded instead of an image represented by the input analog video signal Sva, and therefore dubbing is not achieved. The control procedure then goes to the next step S10.

In step S8, the selecting unit 5 selects the digital video signal Svd as the recording digital video signal Sv for output to the recording processing unit 6. That is, the digital video signal Svd is converted at the selecting unit 5 to an MPEG image signal Smpg, and the MPEG image signal Smpg is recorded on the video file area AAV of the recording unit 7. That is, the input analog video signal Sva is dubbed. The control procedure then goes to the next step S12.

In step S10, the recording processing unit 6 performs a recording process on either one of the fixed value signal Sdc output in step S6 or the digital video signal Svd output in step S8 as the recording digital video signal Sv to generate an MPEG image signal Smpg for output to the recording unit 7. The recording unit 7 records the MPEG image signal Smpg on a recording medium, such as a hard disk. That is, the recording unit 7 starts video file recording on the video file area AAV. Therefore, at this point of time, the video file management information of the video file that has been started to be recorded is not yet recorded on the video file management information area AAD. The control procedure then goes to step S12.

In step S12, the control unit 10a determines whether the recording of the digital video signal Svd is to be stopped. This determination is based on a user instruction, such as whether a recording stop button has been pressed. If it is determined that recording is to be stopped, the control procedure goes to the next step S20. Otherwise, the control procedure goes to step S14. Note that a time interval between steps S4 and S12 is not more than a minimum period in which a copyguard signal is inserted in the analog video signal Sva, and is preferably set to one vertical blanking period.

In step S20, at least the operation of the recording unit 7 is stopped after the video file management information of the video file whose recording is started in step S10 is recorded on the video file management information area AAD, thereby ending the recording operation of the video signal recording apparatus DR1.

In step S14, as with the above-described step S4, it is determined whether the input analog video signal Sva is copying-prohibited. If it is determined that it is copying-prohibited, the control procedure goes to step S16. Otherwise, the control procedure goes to step S18.

In step S16, as with the above-described step S6, the fixed value signal Sdc is selected. The control procedure then goes to the above-described step S12.

In step S18, as with the above-described step S8, the digital video signal Svd is selected. The control procedure then goes to the above-described step S12.

Until it is determined in step S12 that the recording is to be stopped, the processes of steps S14 through S18 are repeated. Note that a time interval between steps S12 and S16 and a time interval between steps S12 and S18 are also set in a manner similar to that of the above-described time interval between steps S4 and S12.

With reference to a time chart illustrated in FIG. 3, a relation in time sequence among signals in the video signal recording apparatus DR1 is briefly described below. In FIG. 3, the horizontal axis represents time, and the vertical axis represents, from top, the analog video signal Sva, the fixed value signal Sdc, the copyright information signal Scr, and the recording digital video signal Sv. In FIG. 3, the states of these signals at times t0, t1, t2, t3, t4, t5, and t6 are schematically exemplified.

That is, the analog video signal Sva is not copyright-protected from the time t0 to the time t1, from the time t2 and the time t3, and from the time t4 to the time t5, and therefore is copying-permitted. On the other hand, portions from the time t1 to the time t2, from the time t3 to the time t4, and from the time t5 to the time t6 are copyright-protected, and therefore are copying-prohibited. Therefore, the copyright information signal Scr becomes Low at the time t0, High at the time t1, Low at the time t2, High at the time t3, Low at the time t4, High at the time t5, and then Low at the time t6.

Between the time t0 and the time t6, the fixed value signal Sdc is constant at a fixed value Dc. Therefore, a signal selected as the recording digital video signal Sv is the digital video signal Svd from the time t0 to the time t1, the fixed value signal Sdc from the time t1 to the time t2, the digital video signal Svd from the time t2 to the time t3, the fixed value signal Sdc from the time t3 to the time t4, the digital video signal Svd from the time t4 to the time t5, and then the fixed value signal Sdc from the time t5 to the time t6. The above-structured recording digital video signals Sv are recorded on the recording unit 7 as one file.

As such, in the recording processing unit 6, the copyright information detection results are no longer required to be considered. That is, in the case of "copying-prohibited", the MPEG image signal Smpg to be recorded on the recording unit 7 has been replaced by a signal indicative of the blue full-screen still picture (the fixed value signal Sdc), and does not have the original analog video signal Sva at all. Also, although only the active pixels are replaced by the fixed values Dc, the synchronizing signals (EAV, SAV) included in the digital video signal Svd are recorded as they are on the recording processing unit 6. Therefore, the recording processing unit 6 can continue the recording process irrespectively of the copyright information signal Scr. This can prevent the recording operation from being repeatedly started and stopped based on the results of detection of the copyright information signal Scr.

As described above, in the video signal recording apparatus according to the first embodiment, a video signal that is copying-prohibited for copyright protection is replaced by a still picture signal not including information representing the original video signal at all. Therefore, the copyright can be completely protected. Also, the copyright information does not influence the control of the recording operation. Therefore, this can prevent creations of a large number of unnecessary management files, and can save storage spaces of the hard disk (the filing system information areas AFS and the video file management information areas AAD). Still further, the copyrighted portion of the video signal is replaced for recording by the fixed value signal Sdc. At the time of replaying, that copyrighted portion is displayed as a blue full-screen still picture. Therefore, the user can easily recognize that the desired video is copyright-protected. Particularly, even if the program to be recorded in timer-controlled recording is copying-prohibited, a blue full-screen still picture is recorded. With this, it is easy to recognize at the time of replaying that the program is copying-prohibited, and therefore no means for notifying the user of copying prohibition is required. Note that, instead of the fixed value signal Sdc, any signal can be recorded as long as the user can easily recognize that another video has been recorded instead of the input video signal. Examples of such signals are signals indicative of an on-screen message, a specific motion picture, a multi-colored picture, or voice.

Second Embodiment

Figure 4:
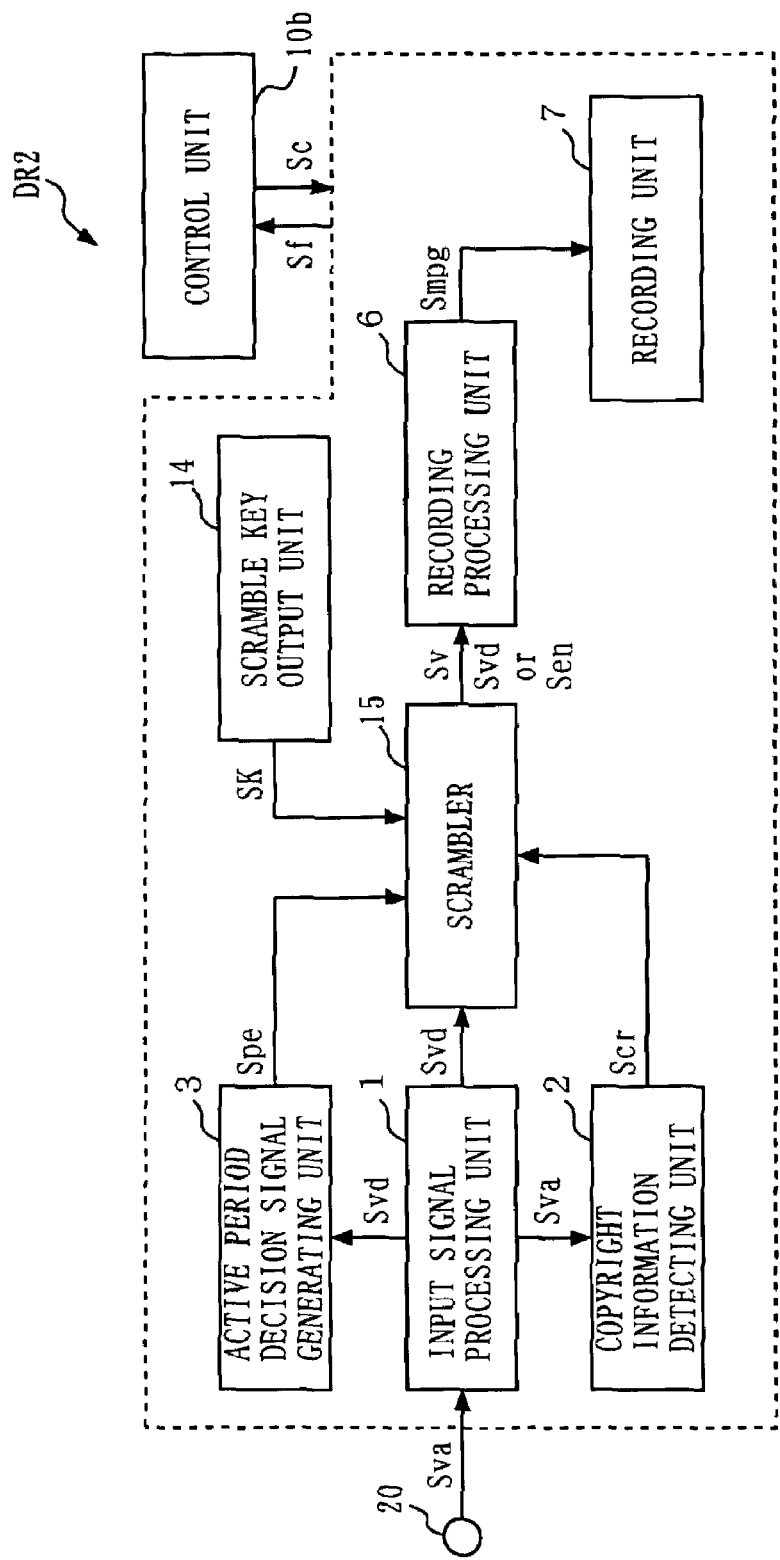
FIG. 4 is a block diagram illustrating the structure of a video signal recording apparatus according to a second embodiment of the present invention.
Figure 5:
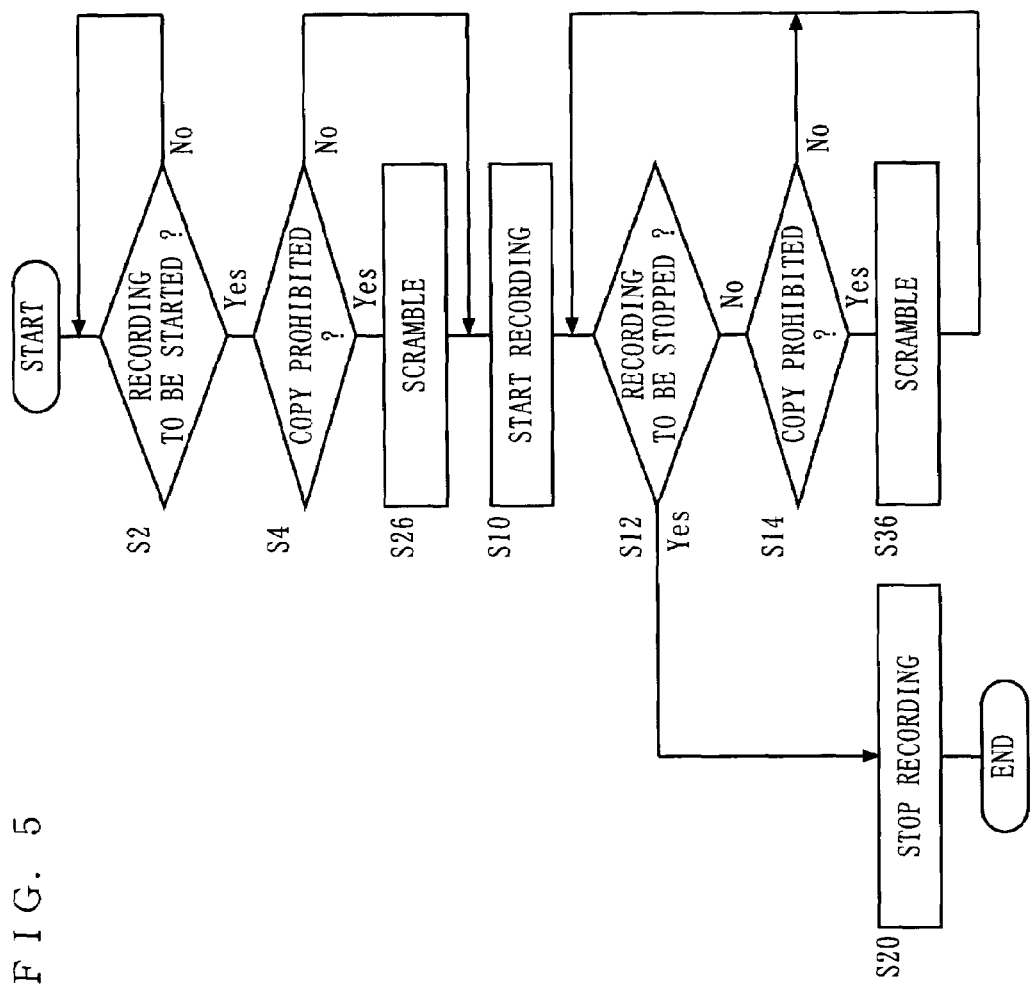
FIG. 5 is a flowchart showing the operation of the video signal recording apparatus illustrated in FIG. 4.
Figure 6:
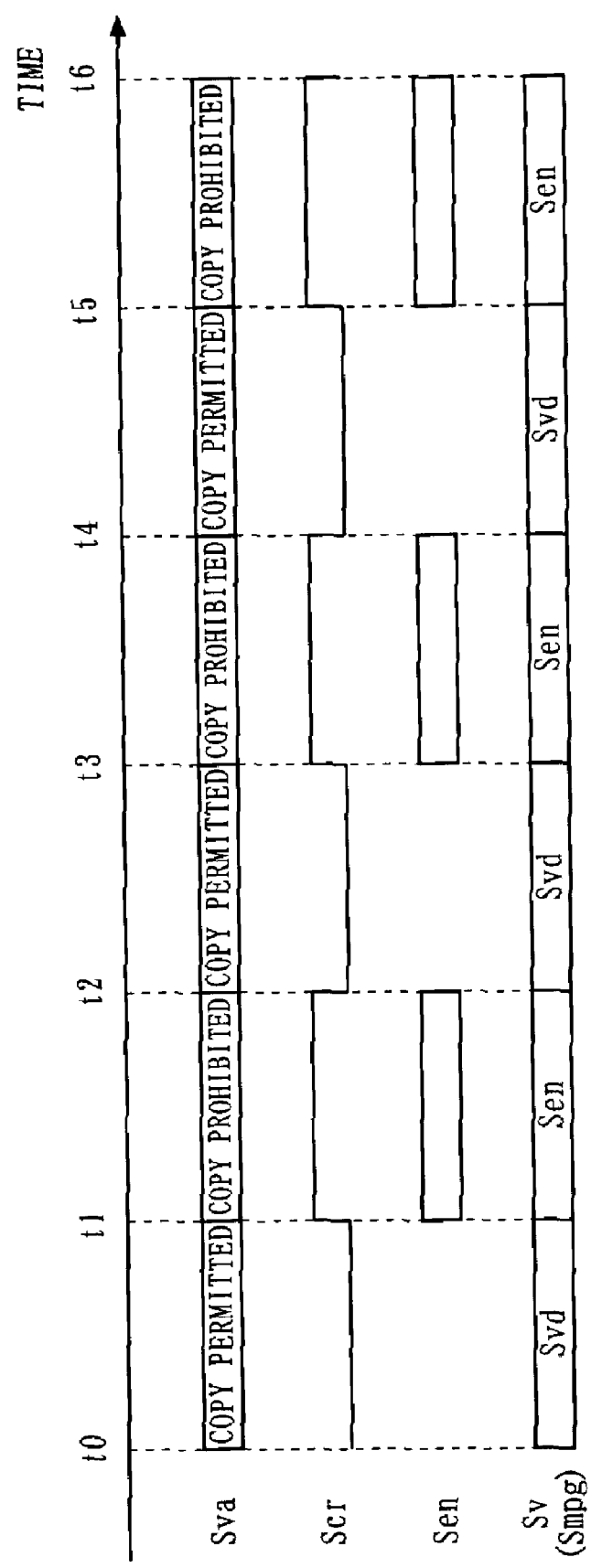
FIG. 6 is a time chart showing various signals in the video signal recording apparatus illustrated in FIG. 4.

With reference to FIGS. 4, 5, and 6, a video signal recording apparatus according to a second embodiment of the present invention is described below. A video signal recording apparatus DR2 according to the second embodiment is similar in structure to the video signal recording apparatus DR1 illustrated in FIG. 1 except that the selecting unit 5 is replaced by a scrambler 15, the fixed value output unit 4 is replaced by a scramble key output unit 14, and the control unit 10a is replaced by a control unit lob. Therefore, descriptions below are made mainly to features unique to the video signal recording apparatus DR2.

The scramble key output unit 14 outputs a scramble key SK predetermined for each provider providing the digital video signal Svd to the scrambler 15. The scramble key SK may be transmitted as being attached to the analog video signal Sva. In this case, if the input signal processing unit 1 is structured so as to extract the scramble key SK from the analog video signal Sva, the scramble key output unit 14 is not required.

The scrambler 15 uses the scramble key SK output from the scramble key output unit 14 to scramble the copying-prohibited portion of the digital video signal Svd. As a result, in the video signal recording apparatus DR2, as with the video signal recording apparatus DR1, the signals indicative of the copyrighted work are replaced by other signals, and are then recorded by the recording unit 7. With this, the copyrighted work can be protected.

In the video signal recording apparatus DR1, even if the replaying and use of the copyrighted work is permitted later in consideration of payment of certain sums, for example, the signals indicative of the copyrighted work have been irrevocably replaced by different signals (the fixed value signal Sdc), and therefore the copyrighted work can never be replayed. By contrast, in the video signal recording apparatus DR2, once the scramble key SK is obtained from the owner of copyright in consideration of payment of certain sums, for example, the original copyrighted work can be fully replayed by utilizing the scrambled and then recorded portions.

With reference to a flowchart illustrated in FIG. 5, the recording operation of the video signal recording apparatus DR2 is described below by focusing on the operation of the scrambler 15. The flowchart of the recording operation of the video signal recording apparatus DR2 is similar to the flowchart illustrated in FIG. 2 except that step S6 is replaced by step S26, step S16 is replaced by step S36, and steps S8 and S18 are eliminated.

Once the video signal recording apparatus DR2 is powered on to start the digital video signal recording operation, whether to start recording is first determined in step S2. Then, when it is determined in step S4 that the input analog video signal Sva is copying-prohibited, the control procedure goes to step S26.

In step S26, the scrambler 15 scrambles (encrypts) the recording digital video signal Svd with the scramble key SK supplied by the scramble key output unit 14 to generate an encrypted video signal Sen. The encrypted video signal Sen is then output to the recording processing unit 6 as the recording digital video signal Sv. The control procedure then goes to step S10.

On the other hand, if it is determined in step S4 that the input analog video signal Sva is copying-permitted, the control procedure skips step S26 to go to step S10.

In step S10, the recording processing unit 6 performs a recording process on the encrypted video signal Sen generated by scrambling in step S26 or the unscrambled digital video signal Svd to generate an MPEG image signal Smpg for output to the recording unit 7. The recording unit 7 records the MPEG image signal Smpg on a recording medium, such as a hard disk.

Then, if it is determined in step S12 that the recording is to be stopped, the recording operation of the video signal recording apparatus DR2 ends. If, on the other hand, it is determined in step S12 that the recording is not to be stopped, and if it is determined in step S14 that the input analog video signal Sva is copy-prohibited, the procedure goes to step S36, in which, as with step S26, the digital video signal Svd is scrambled for generating an encrypted video signal Sen. The encrypted video signal Sen is subjected to signal processing at the recording processing unit 6 to be the recording digital video signal Sv, and is then recorded on the recording unit 7. If, on the other hand, it is determined in step S14 that the input analog video signal Sva is copy-permitted, the recording digital video signal Sv corresponding to the input analog video signal Sva is subjected to signal processing for recording.

With reference to a time chart illustrated in FIG. 6, a relation in time sequence among signals in the video signal recording apparatus DR2 is briefly described below. The time chart illustrated in FIG. 6 is similar to the time chart illustrated in FIG. 3 except the fixed value signal Sdc is eliminated, and the encrypted video signal Sen is inserted between the copyright information signal Scr and the recording digital video signal Sv. Note that, unlike the fixed value signal Sdc being always generated independently, the encrypted video signal Sen is generated by scrambling only during a period in which the copyright information signal Scr is at a High level.

Therefore, the recording digital video signal Sv supplied to the recording processing unit 6 is the digital video signal from the time to the time t1, the encrypted video signal Sen from the time t1 to the time t2, the digital video signal from the time t2 to the time t3, the encrypted video signal Sen from the time t3 to the time t4, the digital video signal Svd from the time t4 to the time t5, and the encrypted video signal Sen from the time t5 to the time t6. The above-structured recording digital video signals Sv are recorded on the recording unit 7 as one file.

As such, in the second embodiment, the video signal indicative of the copyrighted work is recorded as the encrypted video signal, which is different from the original analog video signal Sva. With this, copyright protection can be satisfied. Also, when the use of the copyrighted work is permitted later with the removal of copyright restrictions, the copyrighted work can be replayed by utilizing the encrypted video signal Sen in the MPEG image signal Smpg recorded on the video file area AAV.

Third Embodiment

Figure 7:
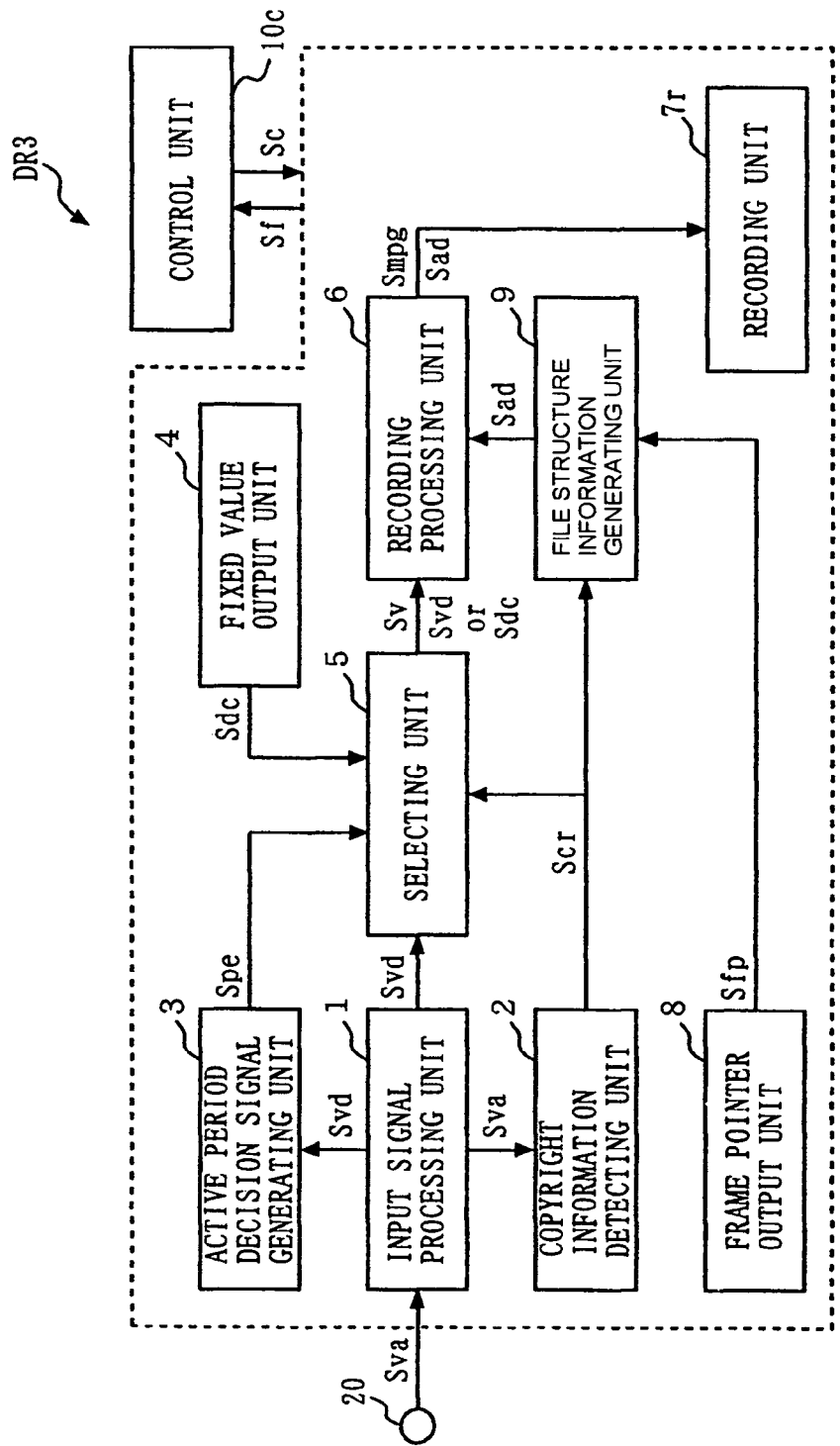
FIG. 7 is a block diagram illustrating the structure of a video signal recording apparatus according to a third embodiment of the present invention.
Figure 8:
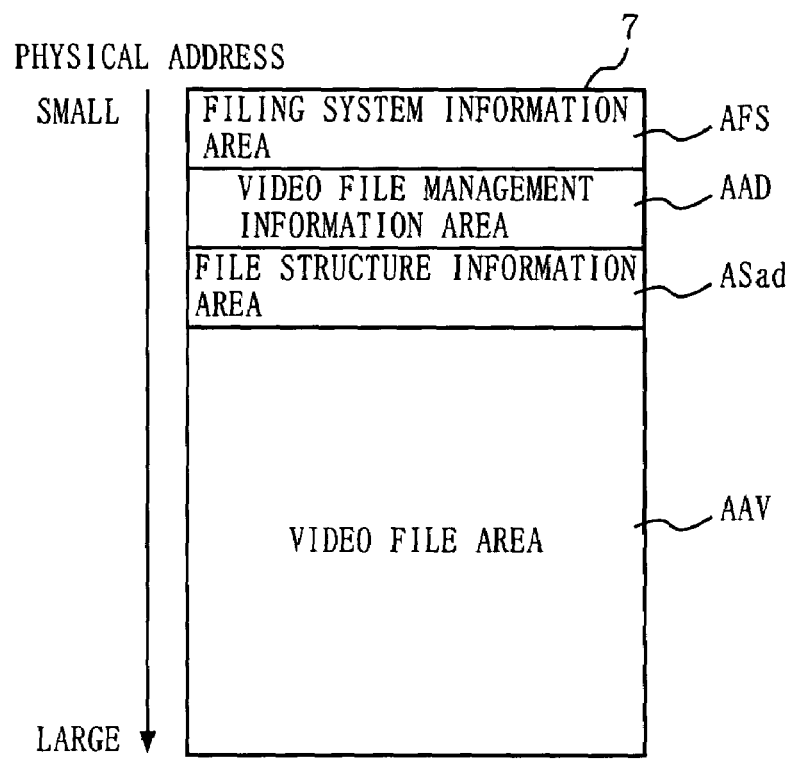
FIG. 8 is a schematic view illustrating the structure of storage areas in a recording unit illustrated in FIG. 7.
Figure 9:
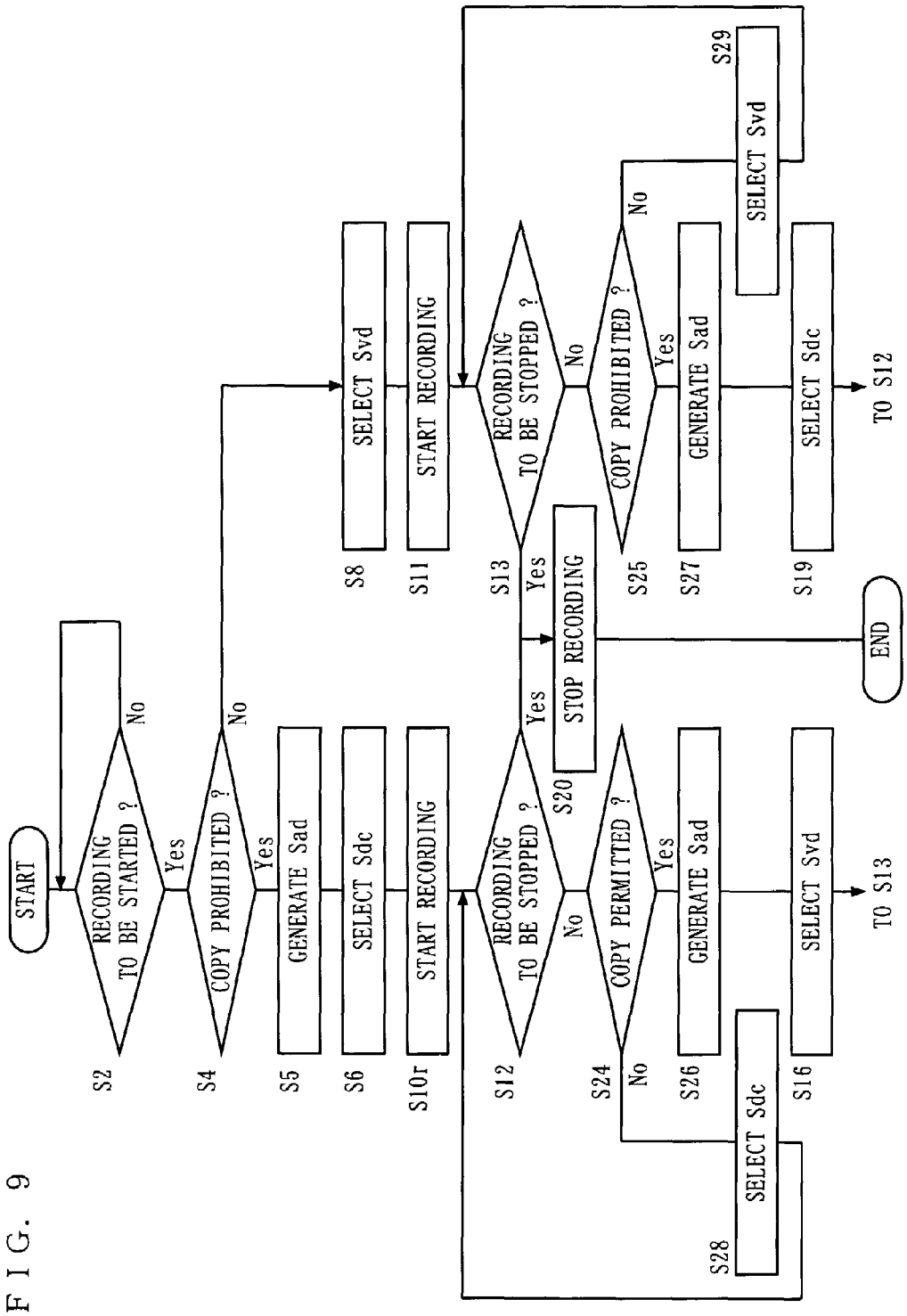
FIG. 9 is a flowchart showing the operation of the video signal recording apparatus illustrated in FIG. 7.

With reference to FIGS. 7, 8, and 9, a video signal recording apparatus according to a third embodiment of the present invention is described below. A video signal recording apparatus DR3 according to the third embodiment is similar in structure to the video signal recording apparatus DR1 illustrated in FIG. 1 except that a file structure information generating unit 9 is newly inserted between the copyright information detecting unit 2 and the recording processing unit 6, a frame pointer output unit 8 is added, the control unit 10 is replaced by a control unit 10c, and the recording unit 7 is replaced by a recording unit 7r. Therefore, descriptions below are made mainly to features unique to the video signal recording apparatus DR3.

The frame pointer output unit 8 outputs a frame pointer Sfp that can specify an image carried by the analog video signal Sva at a resolution at least per frame. The frame pointer output unit 8 is preferably structured by a clock or a counter. The resolution of the frame pointer Sfp to be used is specified per frame. This is because an image is composed of one frame (two fields), although the minimum period of the copyguard signal is one field, as described above. However, needless to say, a frame pointer that can specify the resolution per field can be used as required in agreement with the minimum period of the copyguard signal.

Based on the copyright information signal Scr and the frame pointer Sfp, the file structure information generating unit 9 generates file structure information Sad. The file structure information Sad includes boundary information specifying, per image (frame), boundaries at which the state of copyright protection of the analog video signal Sva is changed, and copyrighted work information indicative of whether the analog video signal Sva between the specified boundaries indicates "copying-prohibited (copyrighted work)" or "copying-permitted (non-copyrighted work)". The file structure information Sad is recorded through the recording processing unit 6 on the recording unit 7r together with the MPEG image signal Smpg.

The recording areas of a recording medium of the recording unit 7r are schematically illustrated in FIG. 8. The recording medium of the recording unit 7r includes, as with the recording medium of the recording unit 107, a filing system information area AFS, a video file management information area AAD, and a video file area AAV, as well as a file structure information area ASad, on which the file structure information Sad is recorded. The file structure information area ASad may be shared by the other areas.

The file structure information Sad is different from the above-described video file management information. As described above, the video file management information includes, for each file recorded on the video file area AAV, a recording start time, a recording time length, a recoding TV channel, a recoding TV program, and recoding mode information. By contrast, the file structure information Sad indicates, per frame, whether the image recorded per frame is based on the digital video signal Svd or the fixed value signal Sdc.

With reference to a flowchart illustrated in FIG. 9, the recording operation of the video signal recording apparatus DR3 is described below by focusing on the operation of the file structure information generating unit 9. The flowchart of the recording operation of the video signal recording apparatus DR3 is similar to the flowchart of the video signal recording apparatus DR1 illustrated in FIG. 2 in steps S2, S4, S6, S8, S10, and S12, but is different therefrom in that step S5 is newly inserted between steps S4 and S6, steps S24, S26, and S28 are newly inserted between steps S12 and S16, steps S11, S13, S19, S25, S27, and S29 are added after step S8, and step S10 is replaced by step S10r.

Once the video signal recording apparatus DR3 is powered on to start the operation, first, after it is determined in step S2 that recording is to be started, if it is determined in step S4 that the input analog video signal Sva is copying-prohibited, the control procedure goes to the newly-provided step S5.

In step S5, the file structure information Sad is generated based on the frame pointer Sfp and the copyright information signal Scr. Then, in the next step S6, the fixed value signal Sdc is output from the selecting unit 5 to the recording processing unit 6 for conversion to an MPEG image signal Smpg, which is then recorded on the recording unit 7.

Furthermore, in the next step S10r, the fixed value signal Sdc is subjected to a recording process for conversion to an MPEG image signal Smpg, which is then recorded on the recording unit 7. At this time, the file structure information Sad generated in the above step S5 is also recorded. The control procedure then goes to the next step S24.

In step S24, it is determined whether the input analog video signal Sva is copying-permitted. If it is determined that the input analog video signal Sva is not copying-permitted, the control procedure goes to step S28.

In step S28, the fixed value signal Sdc is output as the recording digital video signal Sv, subjected to a recoding process, and is then recorded on the recording unit 7. Since the copying-prohibited analog video signal Sva is inputted (No in step S24), it is not necessary to create management information. The control procedure then returns to the above step S12.

On the other hand, in step S11, the digital video signal Svd selected in step S8 as the recording digital video signal Sv is subjected to a recoding process at the recording processing unit 6, and is then recorded. The control procedure then goes to the next step S13.

In step S13, as with step S12, it is determined whether the recording is to be stopped. If it is determined that the recording is to be stopped, the control procedure goes to step S20, and then the operation of the video signal recording apparatus DR3 ends. If, on the other hand, it is determined in step S13 that the recording is not to be stopped, the control procedure goes to the next step S25.

In step S25, it is determined whether the input analog video signal Sva is copying-prohibited. If it is determined that the input analog video signal is copying-prohibited, the control procedure goes to step S27.

In step S27, the file structure information Sad is generated. This is because the state of copyright protection has been changed from the decision made in step S4 that the input analog video signal Sva is copying-permitted, and also the contents to be recorded have been changed. The control procedure then goes to the next step S19.

In step S19, as with the above step S6, the fixed value signal Sdc is selected and then recorded on the recording unit 7r. At the same time, the file structure information Sad generated in step S27 is also recorded. The control procedure then goes to the above step S12.

If, on the other hand, it is determined in step S25 that the input analog video signal Sva is copying-permitted, the control procedure goes to step S29.

In step S29, the digital video signal Svd is selected, subjected to a recording process at the recording processing unit 6, and is then recorded on the recording unit 7r.

Since the state of copyright protection has not been changed from the decision made in step S4 that the input analog video signal Sva is copying-permitted, it is not necessary to generate the file structure information Sad. The control procedure then returns to step S13.

When it is determined in step S13 that the recording is to be stopped, the control procedure goes to step S20, and then the operation of the video signal recording apparatus DR3 ends.

As described above, every time the analog video signal Sva is changed to copying-permitted or copying-prohibited, the file structure information Sad is generated and then recorded on the file structure information area ASad of the recording unit 7r.

Figure 10:
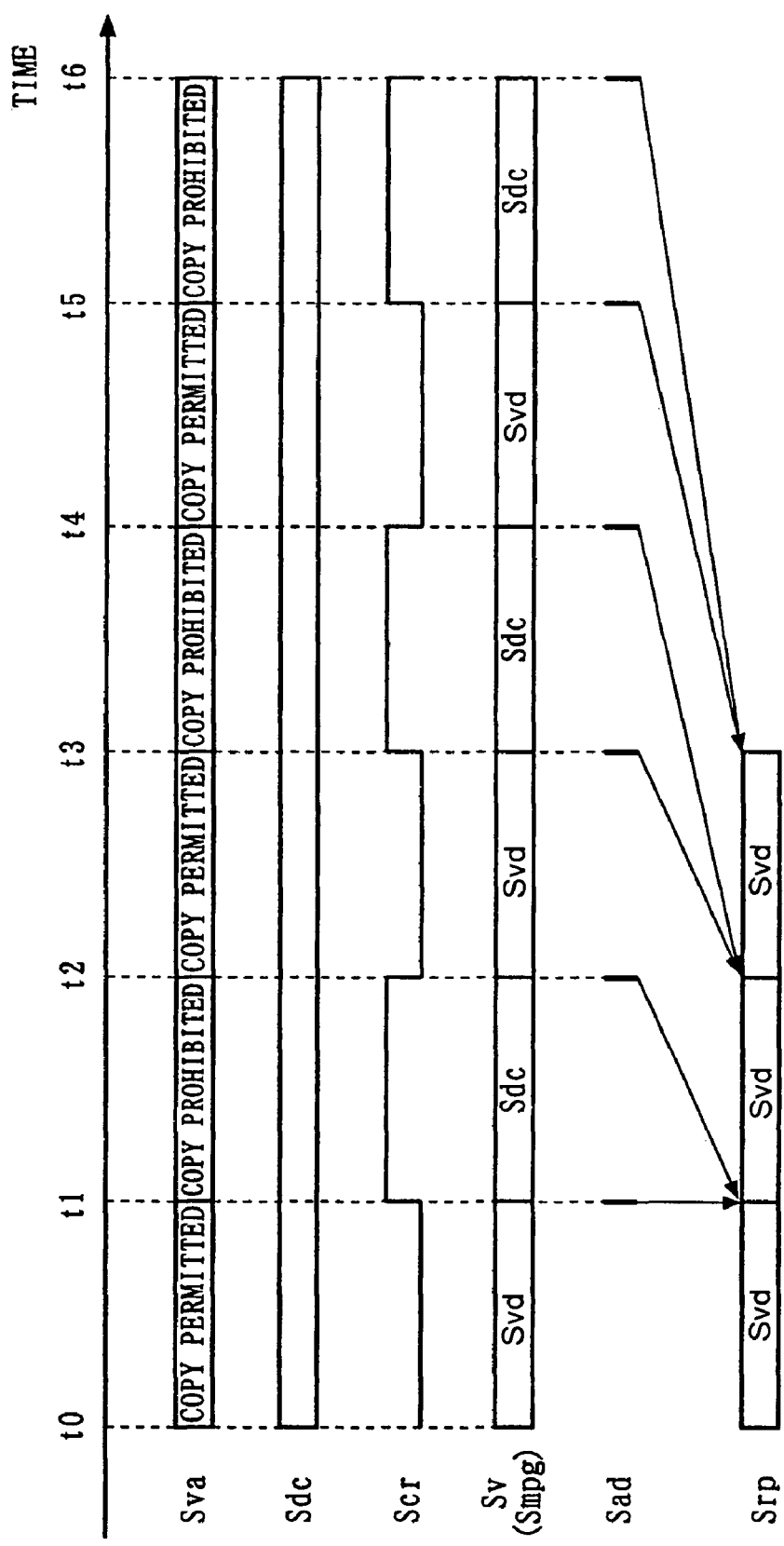
FIG. 10 is a time chart showing various signals in the video signal recording apparatus illustrated in FIG. 7.

With reference to a time chart illustrated in FIG. 10, a relation in time sequence among signals in the video signal recording apparatus DR3 is briefly described below. The time chart illustrated in FIG. 10 is similar to the time chart illustrated in FIG. 3 except that the file structure information Sad and a reproduced signal Srp are included. As described above, the file structure information Sad is generated every time the state of copyright protection of the analog video signal Sva is changed (at the times t1, t2, t3, t4, t5, and t6), that is, every time the value of the copyright information signal Scr is changed. The file structure information Sad is recorded on the recording unit 7r together with the MPEG image signal Smpg.

When the MPEG image signal Smpg recorded in the above-described manner is reproduced from the recording unit 7r, based on the file structure information Sad, the fixed value signal Sdc is skipped, and only the digital video signals Svd are sequentially reproduced as one file, which is shown in the reproduced signal Srp.

By using the file structure information Sad, a video player can present to the user that there are portions where the fixed value signal Sdc is recorded and portions where the digital video signal Svd is recorded or that the fixed value signal Sdc is recorded for the purpose of copyright protection.

Fourth Embodiment

Figure 11:
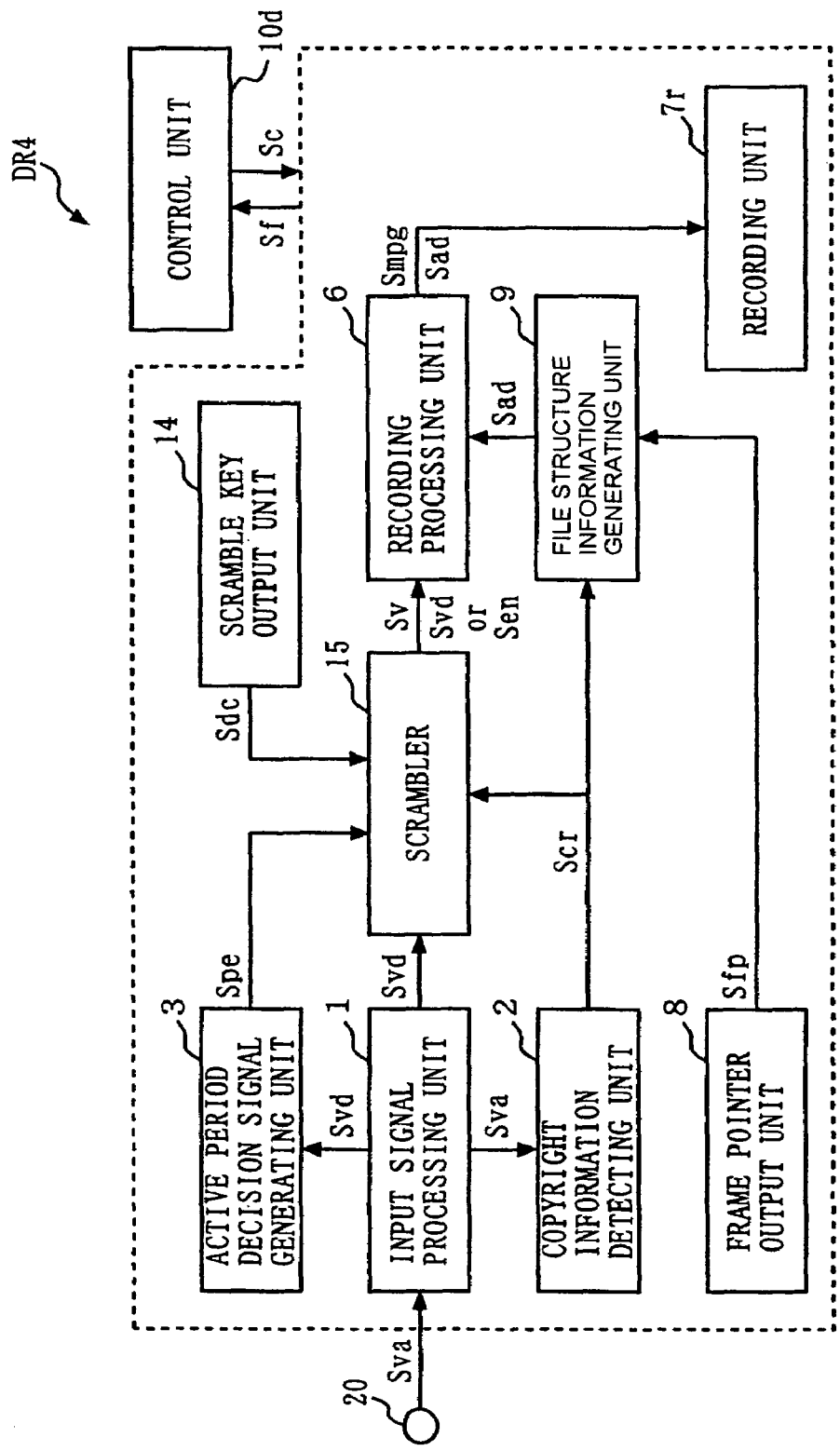
FIG. 11 is a block diagram illustrating the structure of a video signal recording apparatus according to a fourth embodiment of the present invention.
Figure 12:
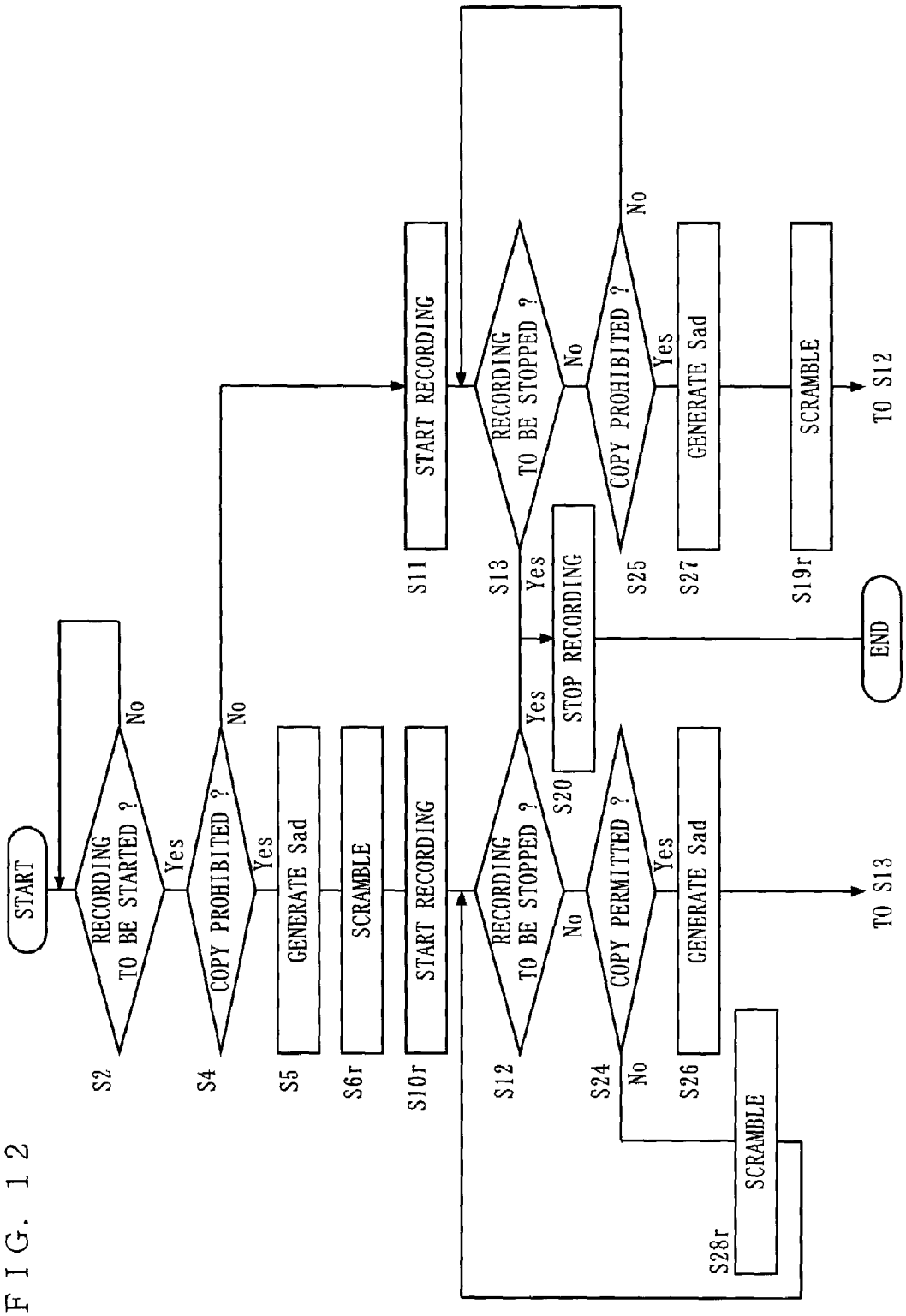
FIG. 12 is a flowchart showing the operation of the video signal recording apparatus illustrated in FIG. 11.

With reference to FIGS. 11 and 12, a video signal recording apparatus according to a fourth embodiment of the present invention is described below. As illustrated in FIG. 11, a video signal recording apparatus DR4 according to the fourth embodiment is similar to the video signal recording apparatus DR3 illustrated in FIG. 7 except that the fixed value output unit 4 and the selecting unit 5 are replaced by the scramble key output unit 14 and the scrambler 15. That is, when the fixed value signal Sdc is output from the video signal recording apparatus DR4, the analog video signal Sva is scrambled for output.

With reference to FIG. 12, the recording operation of the video signal recording apparatus DR4 is described below by focusing on scrambling. The flowchart of the recording operation of the video signal recording apparatus DR4 is similar to the flowchart of the video signal recording apparatus DR3 illustrated in FIG. 9 except that steps S8, S16, and S29 are eliminated, and steps S6, S19, S28 are replaced by steps S6r, S19r, and S28r, respectively.

That is, after steps S2 S4, and S5 are through, the digital video signal Svd is scrambled in step S6r and is then recorded in step S10r. The control procedure then goes through steps S12 S24, S28r to S12 and through step S26, thereby returning to step S13.

If it is determined in step S4 that the input analog video signal Sva is not copying-prohibited, the control procedure goes to steps S1, S13, S25, and then S27. Then, in step S19r, the digital video signal Svd is scrambled. The control procedure goes to step S12.

Fifth Embodiment

Figure 13:
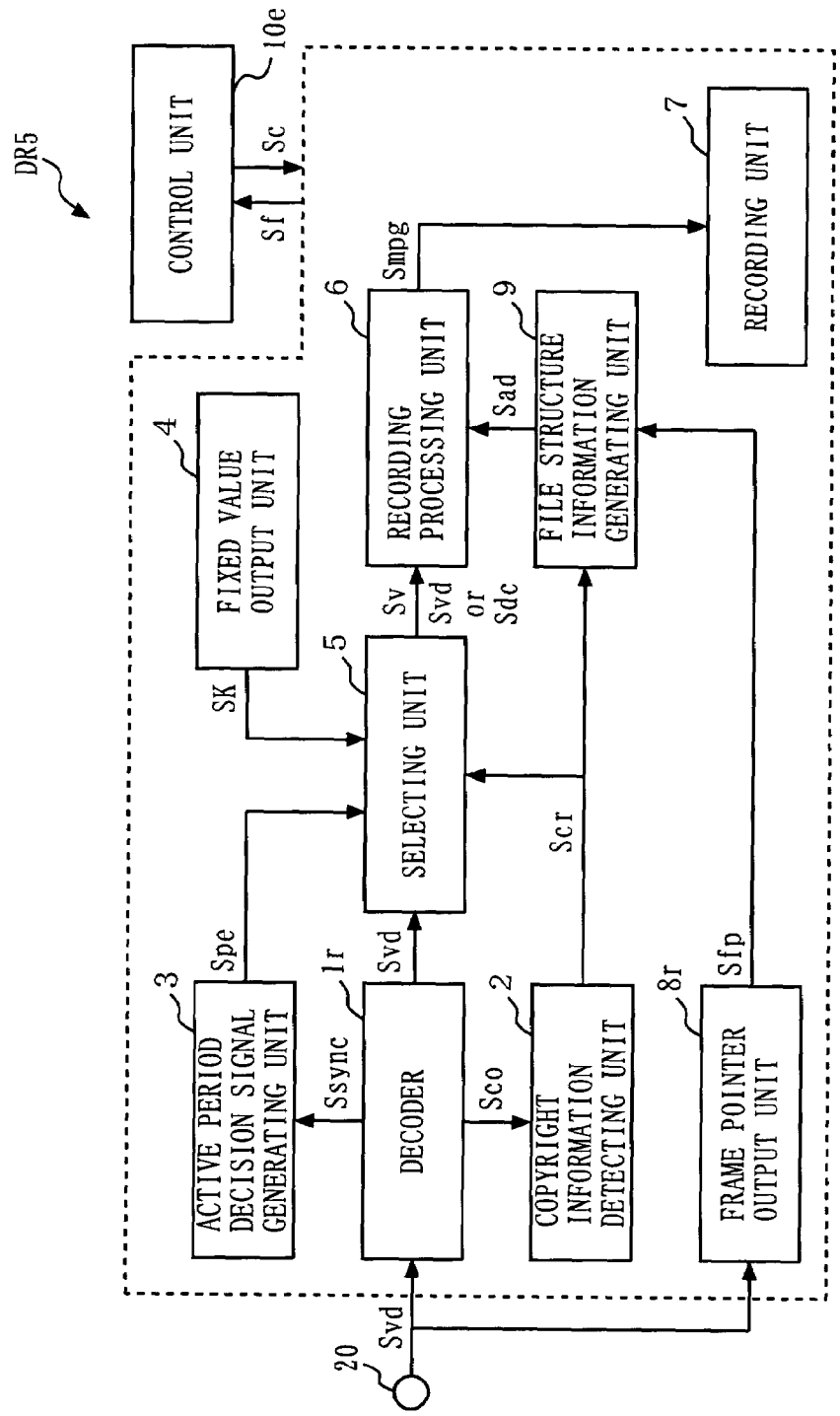
FIG. 13 is a block diagram illustrating the structure of a video signal recording apparatus according to a fifth embodiment of the present invention.

With reference to FIG. 13, a video signal recording apparatus according to a fifth embodiment of the present invention is described below. As illustrated in FIG. 13, a video signal recording apparatus DR5 according to the fifth embodiment is supplied at the input terminal 20 with a digital video signal Svd instead of the analog video signal Sva. Therefore, the video signal recording apparatus DR5 is similar in structure to the video signal recording apparatus DR3 illustrated in FIG. 7 except that the input signal processing unit 1 is replaced by a decoder 1r, and also the frame pointer output unit 8 is replaced by a frame pointer output unit 8r. The digital video signal Svd is supplied to the decoder 1r and the frame pointer output unit 8r.

The decoder 1r extracts copyguard information Sco from the digital video signal Svd for output to the copyright information detecting unit 2, and also extracts synchronization information Ssync from the digital video signal Svd for output to the active period decision signal generating unit 3. Furthermore, the frame pointer output unit 8r outputs a frame pointer Sfp based on PCR (Program Clock Reference) to the file structure information generating unit 9. The subsequent processes are similar to those of the video signal recording apparatus DR3, and therefore are not described herein.

Sixth Embodiment

Figure 14:
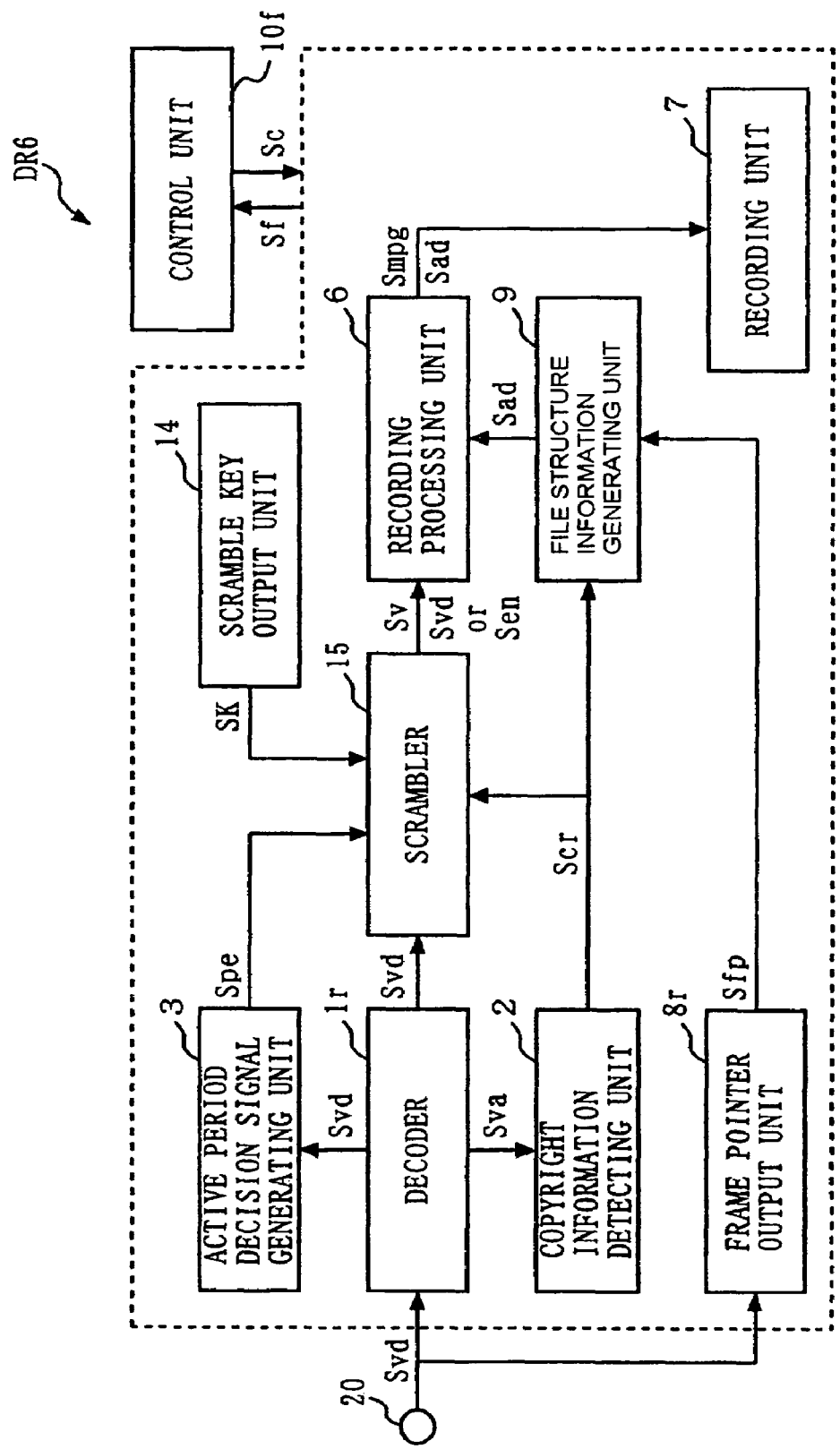
FIG. 14 is a block diagram illustrating the structure of a video signal recording apparatus according to a sixth embodiment of the present invention.
Figure 15:
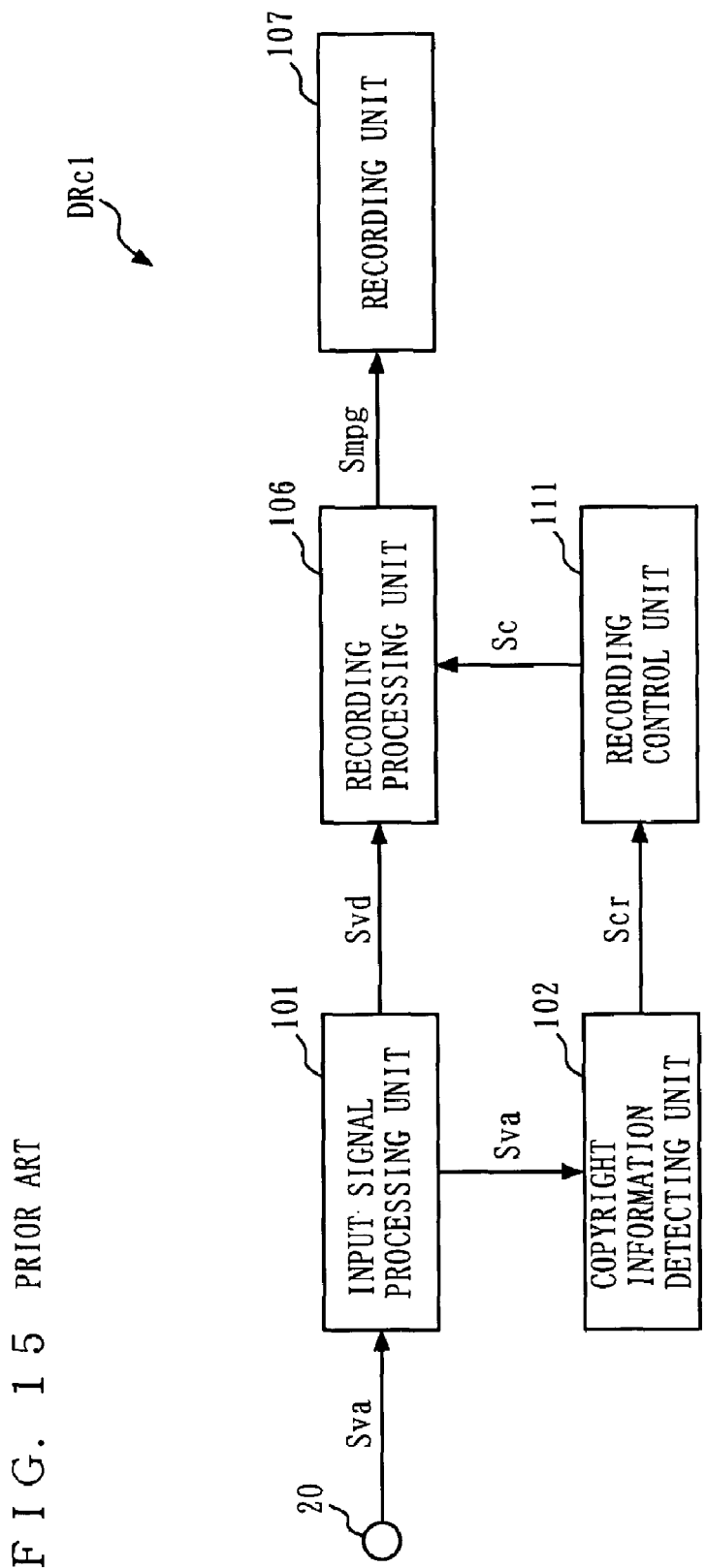
FIG. 15 is a block diagram illustrating the structure of a conventional video signal recording apparatus.
Figure 16:
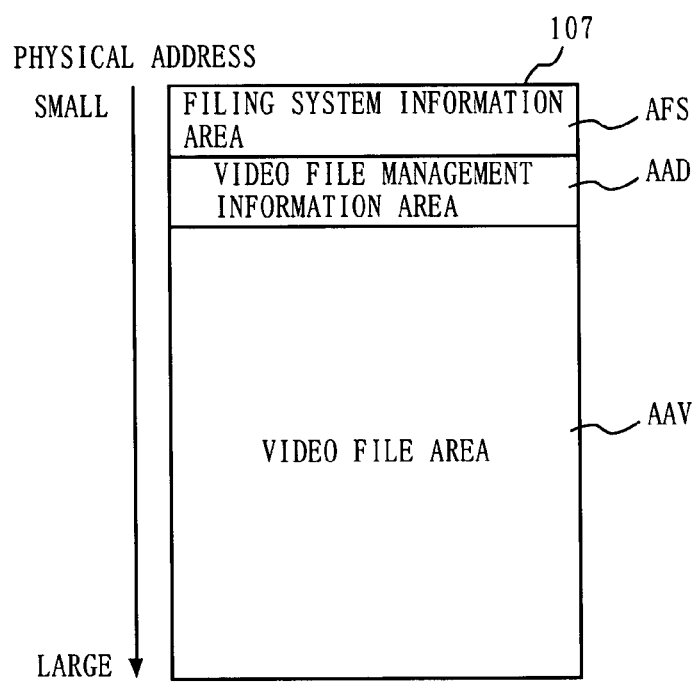
FIG. 16 is a schematic view illustrating the structure of storage areas in a recording unit illustrated in FIG. 15.
Figure 17:
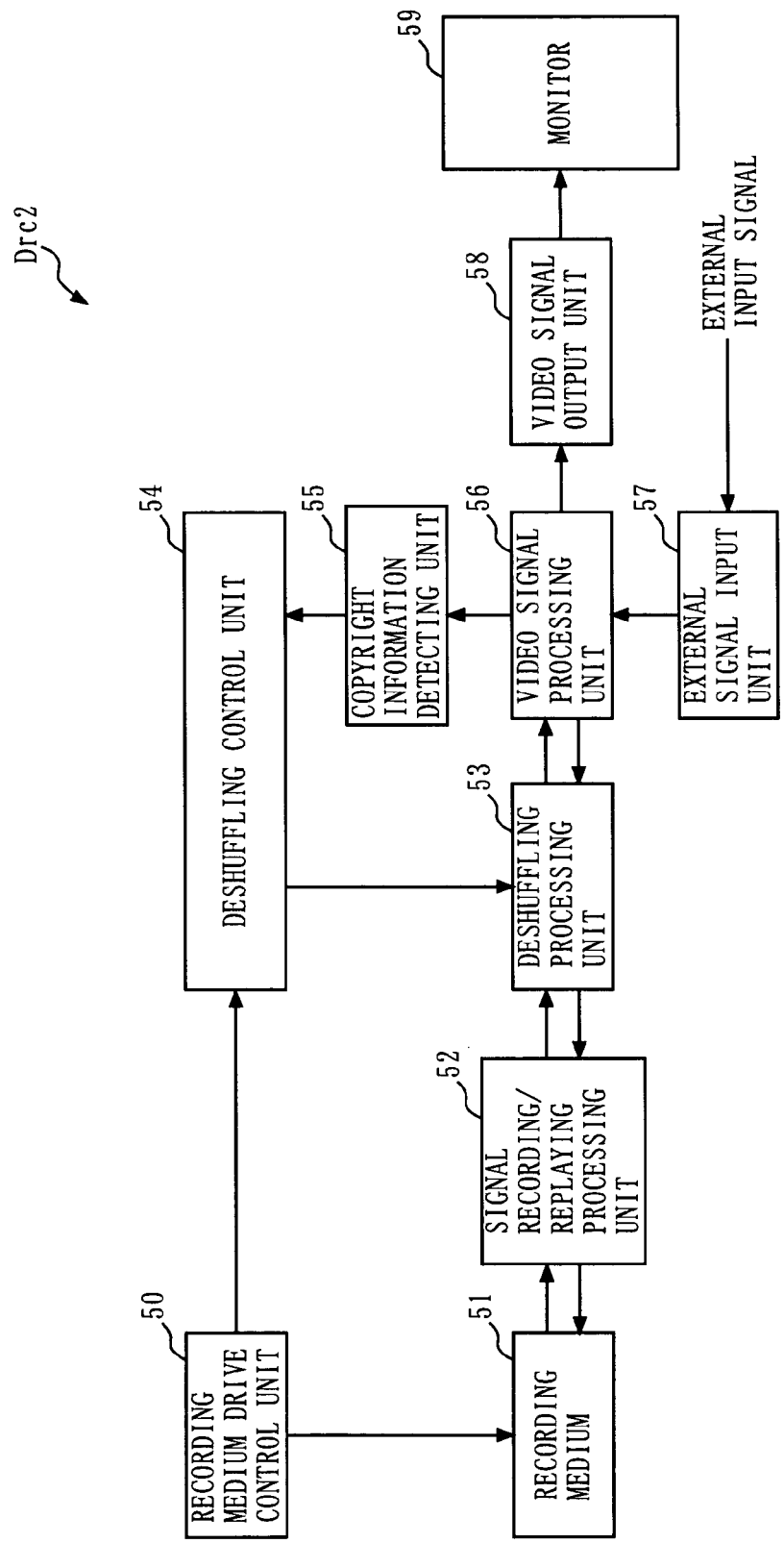
FIG. 17 is a block diagram illustrating the structure of another conventional video signal recording apparatus, which is different from the one illustrated in FIG. 15.

With reference to FIG. 14, a video signal recording apparatus according to a sixth embodiment of the present invention is described below. A video signal recording apparatus DR6 according to the sixth embodiment is similar in structure to the video signal recording apparatus DR5 illustrated in FIG. 13 except that the fixed value output unit 4 and the selecting unit 5 are replaced by the scramble key output unit 14 and the scrambler 15, respectively. The operations of the scramble key output unit 14 and the scrambler 15 are the same as those described with reference to FIG. 4, and therefore are not described herein.

As described above, the present invention can be applied to a recoding apparatus for recording video signal containing information representing a copyrighted work.

While the invention has been described in detail, the foregoing description is in all aspects illustrative and not restrictive. It is understood that numerous other modifications and variations can be devised without departing from the scope of the invention.

What is claimed is:

1. A video signal recording apparatus for digitally recording a first video signal containing information representing a copyrighted work and information representing a non-copyrighted work, comprising:
   a copyright information detecting device configured to extract copyright information inserted in the first video signal;
   an active pixel period detecting device configured to detect an active pixel period of the first video signal, and generate an active pixel period decision signal;
   a video signal output device configured to output a second video signal containing information representing another non-copyrighted work;
   a video signal generating device configured to generate a third video signal by replacing the first video signal by the second video signal in the active pixel period, upon determining, based on the copyright information and the active pixel period decision signal that the first video signal represents the information representing the copyrighted work;
   a digital recording device configured to digitally record the third video signal on a recording medium as one video file;
   a boundary detecting device configured to detect a boundary between the copyrighted work and the non-copyrighted work in the first video signal; and
   a file structure information generating device configured to generate file structure information indicative of boundaries between the copyrighted work and the non-copyrighted work in the video file, wherein
   the digital recording device is further configured to digitally record the file structure information.

2. The video signal recording apparatus according to claim 1, wherein
   the first video signal is an analog signal, and
   said boundary detecting device comprises a clock configured to identify a period shorter than a frame period of the first video signal.

3. The video signal recording apparatus according to claim 1, wherein
   the first video signal is a digital signal, and
   said boundary detecting device is further configured to generate an output based on program clock references included in the first video signal.

* * * * *